(12) United States Patent
Demont et al.

(10) Patent No.: US 10,854,866 B2
(45) Date of Patent: Dec. 1, 2020

(54) POWER SUPPLY STORAGE AND FIRE MANAGEMENT IN ELECTRICALLY-DRIVEN AIRCRAFT

(71) Applicant: H55 SA, Sion (CH)

(72) Inventors: Sébastien Demont, Les Agettes (CH); Franco Summermatter, Sion (CH); Sébastien Luisier, Bruson (CH)

(73) Assignee: H55 SA, Sion (CH)

( * ) Notice: Subject to any disclaimer, the term of this patent is extended or adjusted under 35 U.S.C. 154(b) by 0 days.

(21) Appl. No.: 16/842,595

(22) Filed: Apr. 7, 2020

(65) Prior Publication Data

US 2020/0317357 A1 Oct. 8, 2020

Related U.S. Application Data

(60) Provisional application No. 62/830,691, filed on Apr. 8, 2019.

(51) Int. Cl.
*H01M 2/20* (2006.01)
*H01M 10/613* (2014.01)
(Continued)

(52) U.S. Cl.
CPC ......... *H01M 2/208* (2013.01); *H01M 2/0447* (2013.01); *H01M 2/1088* (2013.01);
(Continued)

(58) Field of Classification Search
None
See application file for complete search history.

(56) References Cited

U.S. PATENT DOCUMENTS

| 4,434,389 A | 2/1984 | Langley et al. |
| 4,550,267 A | 10/1985 | Vaidya |

(Continued)

FOREIGN PATENT DOCUMENTS

| CN | 102255113 | 11/2011 |
| CN | 105711434 A | 6/2016 |

(Continued)

OTHER PUBLICATIONS

Farrell et al., "Designing a Battery Exchange Building for Automated Guided Vehicles", Ports 2016, American Society of Civil Engineers, 2016, pp. 71-80.

(Continued)

*Primary Examiner* — Scott J. Chmielecki
(74) *Attorney, Agent, or Firm* — Knobbe, Martens, Olson & Bear LLP

(57) ABSTRACT

An electric power apparatus is disclosed for use in powering an electric vehicle with an exhaust channel. The electric power apparatus can include a battery housing and multiple cell tubes. The multiple cell tubes can support multiple battery cells within the multiple cell tubes so that individual of the multiple battery cells may be positioned within individual of the multiple cell tubes. The multiple cell tubes can be supported by the battery housing and direct combustion components from any fires in the multiple battery cells in a common direction. The multiple battery cells can each be self-contained and removable from the multiple cell tubes. The multiple battery cells can be electrically connected to power a motor that propels a vehicle housing, and the vehicle housing can support the battery housing and the motor.

22 Claims, 15 Drawing Sheets

(51) Int. Cl.
  *H01M 10/625* (2014.01)
  *H01M 10/6555* (2014.01)
  *H01M 2/04* (2006.01)
  *H01M 2/10* (2006.01)
  *H01M 2/12* (2006.01)

(52) U.S. Cl.
  CPC ........ *H01M 2/1094* (2013.01); *H01M 2/1264* (2013.01); *H01M 10/613* (2015.04); *H01M 10/625* (2015.04); *H01M 10/6555* (2015.04); *B64D 2221/00* (2013.01)

(56) References Cited

U.S. PATENT DOCUMENTS

| | | | |
|---|---|---|---|
| 4,730,150 | A | 3/1988 | Lee et al. |
| 4,965,879 | A | 10/1990 | Fischer, Jr. |
| 5,225,764 | A | 7/1993 | Falater |
| 5,414,339 | A | 5/1995 | Masaki et al. |
| 5,850,113 | A | 12/1998 | Weimer et al. |
| 6,078,165 | A | 6/2000 | Ashtiani et al. |
| 6,108,347 | A | 8/2000 | Holmquist |
| 6,178,736 | B1 | 1/2001 | Massey |
| 6,366,311 | B1 | 4/2002 | Monroe |
| 6,439,504 | B1 | 8/2002 | Ahrendt |
| 6,791,226 | B1 | 9/2004 | Dhawan |
| 7,207,521 | B2 | 4/2007 | Atkey et al. |
| 7,482,767 | B2 | 1/2009 | Tether |
| 7,598,703 | B2 | 10/2009 | Zhang et al. |
| 7,706,398 | B2 | 4/2010 | Jung et al. |
| 8,120,310 | B2 | 2/2012 | Littrell et al. |
| 8,281,051 | B2 | 10/2012 | Hartwich |
| 8,341,449 | B2 | 12/2012 | Daniel et al. |
| 8,399,112 | B2 | 3/2013 | Yasui et al. |
| 8,738,217 | B2 | 5/2014 | Banker |
| 8,974,930 | B2 | 3/2015 | Oguri et al. |
| 9,436,261 | B2 | 9/2016 | Yun |
| 9,457,666 | B2 | 10/2016 | Caldeira et al. |
| 9,564,762 | B2 | 2/2017 | Lee et al. |
| 9,643,729 | B2 | 5/2017 | Walter-Robinson |
| 9,806,308 | B2 | 10/2017 | Watanabe et al. |
| 9,806,310 | B1 | 10/2017 | Pounds |
| 9,893,335 | B2 * | 2/2018 | Liu ..................... H01M 10/653 |
| 10,131,246 | B2 | 11/2018 | Demont |
| 10,186,694 | B2 | 1/2019 | Ueda et al. |
| 10,186,697 | B1 | 1/2019 | Harris, III |
| 10,204,244 | B2 | 2/2019 | Butler |
| 10,305,078 | B1 * | 5/2019 | Harris, III ........... H01M 2/1077 |
| 10,322,824 | B1 | 6/2019 | Demont et al. |
| 10,326,158 | B2 * | 6/2019 | Lee ..................... H01M 10/61 |
| 10,479,223 | B2 | 11/2019 | Demont |
| 10,576,843 | B2 | 3/2020 | Demont et al. |
| 10,608,304 | B2 * | 3/2020 | Ruehle .................. H01M 2/206 |
| 2003/0182040 | A1 | 9/2003 | Davidson |
| 2005/0162172 | A1 | 7/2005 | Bertness |
| 2006/0109009 | A1 | 5/2006 | Banke |
| 2007/0044737 | A1 | 3/2007 | Lindsey |
| 2007/0164166 | A1 | 7/2007 | Hirvonen |
| 2007/0164168 | A1 | 7/2007 | Hirvonen et al. |
| 2008/0006739 | A1 | 1/2008 | Mochida et al. |
| 2008/0211309 | A1 | 9/2008 | Nolte |
| 2008/0272669 | A1 | 11/2008 | Mohle et al. |
| 2009/0212626 | A1 | 8/2009 | Snyder |
| 2009/0302153 | A1 | 12/2009 | Matasso |
| 2010/0101242 | A1 | 4/2010 | Froelich |
| 2010/0102934 | A1 | 4/2010 | Guichard |
| 2010/0121587 | A1 | 5/2010 | Vian |
| 2010/0255359 | A1 | 10/2010 | Hirakawa et al. |
| 2011/0054721 | A1 | 3/2011 | Goodrich |
| 2011/0254502 | A1 | 10/2011 | Yount et al. |
| 2012/0025032 | A1 | 2/2012 | Hopdjanian |
| 2012/0121949 | A1 | 5/2012 | Eberhard et al. |
| 2012/0146581 | A1 | 6/2012 | Tu |
| 2012/0177970 | A1 | 7/2012 | Marchio et al. |
| 2012/0203482 | A1 | 8/2012 | Parle et al. |
| 2012/0268069 | A1 | 10/2012 | Park |
| 2013/0076190 | A1 | 3/2013 | Jarvinen et al. |
| 2013/0090813 | A1 | 4/2013 | Kanekawa |
| 2013/0216871 | A1 * | 8/2013 | Lee ..................... H01M 2/12 429/62 |
| 2013/0305391 | A1 | 11/2013 | Haukom |
| 2014/0035357 | A1 | 2/2014 | Hausmann et al. |
| 2014/0084817 | A1 | 3/2014 | Bhavaraju |
| 2014/0197681 | A1 | 7/2014 | Iwashima |
| 2014/0303812 | A1 | 10/2014 | Avritch et al. |
| 2014/0339371 | A1 | 11/2014 | Yates et al. |
| 2014/0342201 | A1 | 11/2014 | Andres |
| 2015/0019771 | A1 | 1/2015 | Greef |
| 2015/0115108 | A1 | 4/2015 | Benson et al. |
| 2015/0123622 | A1 | 5/2015 | Yasui |
| 2015/0263546 | A1 | 9/2015 | Senoo |
| 2015/0285165 | A1 | 10/2015 | Steinwandel |
| 2015/0339371 | A1 | 11/2015 | Cao et al. |
| 2015/0344156 | A1 | 12/2015 | Vail, III |
| 2015/0353192 | A1 | 12/2015 | Morrison |
| 2015/0358002 | A1 | 12/2015 | Startin |
| 2016/0047861 | A1 | 2/2016 | Chen |
| 2016/0107758 | A1 | 4/2016 | Esteyne et al. |
| 2016/0197386 | A1 | 7/2016 | Moon et al. |
| 2016/0236790 | A1 | 8/2016 | Knapp |
| 2016/0254576 | A1 | 9/2016 | Burns |
| 2016/0304214 | A1 | 10/2016 | Himmelmann |
| 2016/0347180 | A1 | 12/2016 | Steffani |
| 2016/0359329 | A1 | 12/2016 | Kim et al. |
| 2017/0001511 | A1 | 1/2017 | Kulkami |
| 2017/0008418 | A1 | 1/2017 | Ciampolini et al. |
| 2017/0054314 | A1 | 2/2017 | Tang |
| 2017/0057650 | A1 | 3/2017 | Walter-Robinson |
| 2017/0066531 | A1 | 3/2017 | McAdoo |
| 2017/0126025 | A1 | 5/2017 | Bando et al. |
| 2017/0210229 | A1 | 7/2017 | Brochhaus |
| 2017/0210481 | A1 | 7/2017 | Bak |
| 2017/0214070 | A1 | 7/2017 | Wang |
| 2017/0253344 | A1 | 9/2017 | Wangemann et al. |
| 2017/0309093 | A1 | 10/2017 | Feng |
| 2017/0331163 | A1 * | 11/2017 | Ebner ................. H01M 2/1223 |
| 2018/0012484 | A1 | 1/2018 | Sakabe |
| 2018/0022451 | A1 * | 1/2018 | Lim ..................... B64D 47/06 244/17.23 |
| 2018/0024201 | A1 | 1/2018 | Izawa |
| 2018/0079530 | A1 | 3/2018 | Wyrobek |
| 2018/0105282 | A1 * | 4/2018 | Tweet ..................... A62C 4/00 |
| 2018/0108188 | A1 | 4/2018 | Canning |
| 2018/0138478 | A1 | 5/2018 | Chan |
| 2018/0170511 | A1 | 6/2018 | Mores |
| 2018/0198154 | A1 * | 7/2018 | Lee ..................... H01M 2/1016 |
| 2018/0229618 | A1 | 8/2018 | Lee |
| 2018/0237148 | A1 | 8/2018 | Hehn et al. |
| 2018/0268719 | A1 | 9/2018 | Guan |
| 2018/0283292 | A1 | 10/2018 | Steinwandel |
| 2018/0287234 | A1 | 10/2018 | Melack et al. |
| 2018/0301765 | A1 * | 10/2018 | Knape ............... H01M 10/4257 |
| 2018/0321325 | A1 | 11/2018 | Fortier |
| 2018/0358593 | A1 * | 12/2018 | Seo ..................... H01M 2/34 |
| 2018/0358671 | A1 | 12/2018 | Halsey et al. |
| 2019/0006650 | A1 * | 1/2019 | Bryla ..................... H01M 2/127 |
| 2019/0019638 | A1 | 1/2019 | Humphreys |
| 2019/0097203 | A1 * | 3/2019 | Kwag ..................... H01M 2/105 |
| 2019/0097204 | A1 * | 3/2019 | Liposky ................. H01M 2/345 |
| 2019/0212733 | A1 | 7/2019 | Lan |
| 2019/0221814 | A1 * | 7/2019 | Shimizu ................. H01M 2/105 |
| 2019/0252652 | A1 * | 8/2019 | Guillemard ......... H01M 2/1055 |
| 2019/0319448 | A1 * | 10/2019 | Pevear .................. H02J 7/0026 |
| 2020/0035967 | A1 * | 1/2020 | Yoon ..................... H01M 10/658 |

FOREIGN PATENT DOCUMENTS

| | | |
|---|---|---|
| CN | 205377342 U | 7/2016 |
| DE | 102007054228 | 5/2009 |
| DE | 102013217458 | 3/2015 |
| DE | 102014200997 | 7/2015 |
| DE | 10 2016 109 277 | 11/2017 |
| FR | 2988522 | 9/2013 |
| JP | 2011-114961 | 6/2011 |
| JP | 2012-160347 | 8/2012 |

(56) References Cited

FOREIGN PATENT DOCUMENTS

| | | |
|---|---|---|
| JP | 2012-175823 | 9/2012 |
| JP | 2013-84444 | 5/2013 |
| KR | 10-1733159 | 5/2017 |
| WO | WO 94/14226 | 6/1994 |
| WO | WO 03/026201 | 3/2003 |
| WO | WO 2004/068694 | 8/2004 |
| WO | WO 2012/014348 | 2/2012 |
| WO | WO 2012/147150 | 11/2012 |
| WO | WO 2015/168320 | 11/2015 |
| WO | WO 2018/053680 | 3/2018 |
| WO | WO 2018/130488 | 7/2018 |
| WO | WO 2019/006469 | 1/2019 |
| WO | WO 2019/211810 | 11/2019 |
| WO | WO 2020/044134 | 3/2020 |

OTHER PUBLICATIONS

Saw et al., "Computational fluid dynamic and thermal analysis of Lithium-ion battery pack with air cooling", Applied Energy vol. 177, 2016, pp. 783-792.
H55 Products, https://www.h55.ch/products, date accessed Jan. 16, 2020, in 6 pages.
International Search Report and Written Opinion for International Application No. PCT/IB2020/053320, dated Jul. 6, 2020, in 16 pages.

\* cited by examiner

POWER SUPPLY STORAGE AND FIRE MANAGEMENT IN ELECTRICALLY-DRIVEN AIRCRAFT

RELATED APPLICATIONS

Any and all applications for which a foreign or domestic priority claim is identified in the Application Data Sheet of the present application are hereby incorporated by reference under 37 CFR 1.57.

FIELD OF THE DISCLOSURE

The present disclosure is related to vehicles, such as electric or hybrid aircraft.

BACKGROUND

Electric and hybrid vehicles have become increasingly significant for the transportation of people and goods. Such vehicles can desirably provide energy efficiency advantages over combustion-powered vehicles and may cause less air pollution than combustion-powered vehicles during operation.

Although the technology for electric and hybrid automobiles has significantly developed in recent years, many of the innovations that enabled a transition from combustion-powered to electric-powered automobiles unfortunately do not directly apply to the development of electric or hybrid aircraft. The functionality of automobiles and the functionality of aircraft are sufficiently different in many aspects so that many of the design elements for electric and hybrid aircraft must be uniquely developed separate from those of electric and hybrid automobiles.

Moreover, any changes to an aircraft's design, such as to enable electric or hybrid operation, also require careful development and testing to ensure safety and reliability. If an aircraft experiences a serious failure during flight, the potential loss and safety risk from the failure may be very high as the failure could cause a crash of the aircraft and pose a safety or property damage risk to passengers or cargo, as well as individuals or property on the ground.

The certification standards for electric or hybrid aircraft are further extremely stringent because of the risks posed by new aircraft designs. Designers of aircraft have struggled to find ways to meet the certification standards and bring new electric or hybrid aircraft designs to market.

In view of these challenges, attempts to make electric and hybrid aircraft commercially viable have been largely unsuccessful. New approaches for making and operating electric and hybrid aircraft thus continue to be desired.

SUMMARY

Flying an aircraft, such an airplane, can be dangerous. Problems with the aircraft may result in injury or loss of life for passengers in the aircraft or individuals on the ground, as well as damage to goods being transported by the aircraft or other items around the aircraft.

In order to attempt to mitigate potential problems associated with an aircraft, numerous organizations have developed certification standards for ensuring that aircraft designs and operations satisfy threshold safety requirements. The certification standards may be stringent and onerous when the degree of safety risk is high, and the certification standards may be easier and more flexible when the degree of safety risk is low.

Such certification standards have unfortunately had the effect of slowing commercial adoption and production of electric or hybrid aircraft. Electric or hybrid aircraft may, for example, utilize new aircraft designs relative to traditional aircraft designs to account for differences in operations of electric or hybrid aircraft versus traditional aircraft. The new designs however may be significantly different from the traditional aircraft designs. These differences may subject the new designs to extensive testing prior to certification. The need for extensive testing can take many resources, time and significantly drive up the ultimate cost of the aircraft.

The present disclosure provides simplified, yet robust, components and systems for an electric powered aircraft that simplify and streamline certifications requirements and reduce the cost and time required to produce a commercially viable electrically-driven aircraft.

In particular, safely powering an electric or hybrid aircraft can pose significant difficulties. A power system of an electric or hybrid aircraft can include numerous battery cells, and each of the battery cells can pose a serious safety risk, such as in the event that one or more of the battery cells overheat and catch fire (for instance, due to a manufacturing defect, aging, or abuse of the one or more battery cells). If a fire in one battery cell were to reach other battery cells, the other battery cells may catch fire and cause a chain reaction that would result in the aircraft suffering a catastrophic failure. Thus, the power system of an electric or hybrid aircraft should be carefully managed.

An aircraft in accordance with the disclosure herein can be powered using a power system that is designed to prevent a fire at one or more battery cells from spreading to other battery cells. The power system can include multiple battery packs (sometimes referred to as battery modules) that may be connected. The battery packs can each include a battery housing that supports multiple battery cells electrically connected in series or parallel with one another. The battery packs can each be relatively lightweight rather than encapsulated in a heavy casing, such as a heavy metal casing, that would undesirably add weight to the aircraft. The battery cells of the multiple battery packs can be connected in series or parallel with one another to form a power source for the aircraft. The power system can include an exhaust channel to divert and evacuate from the aircraft fumes, smoke, heat, steam, or combustion materials from a battery cell that has caught fire.

Because battery cells may fail in a predictable matter (such as tending to catch fire and explode from a positive terminal of the battery cells and last for around 10 seconds), individual battery housings can orient the multiple battery cells in the individual battery housings in a common direction with the positive terminals (sometimes referred to as cathodes) of the multiple battery cells being on a common side of the battery housing and facing the exhaust channel. Upon one of the battery cells catching fire, the fire from the battery cell may pass by or through an insulation layer (which may prevent the fire from reaching one or neighboring battery cells), enter the exhaust channel, and be diverted toward or to an exhaust port of the aircraft so that the fumes, smoke, heat, steam, or combustion materials may leave the aircraft.

An electric power apparatus is disclosed for use in powering an electric vehicle with an exhaust channel. The electric power apparatus can include a battery housing and multiple cell tubes. The multiple cell tubes can support multiple battery cells within the multiple cell tubes so that individual of the multiple battery cells may be positioned within individual of the multiple cell tubes. The multiple cell tubes can be supported by the battery housing and direct combustion components from any fires in the multiple battery cells in a common direction. The multiple battery cells can each be self-contained and removable from the multiple cell tubes. The multiple battery cells can be electrically connected to power a motor that propels a vehicle housing, and the vehicle housing can support the battery housing and the motor.

The electric power apparatus of the preceding paragraph can include one or more of the following features: The electric power apparatus can include a cover supported by the battery housing, and the cover can include a material that absorbs heat from a first fire in one of the multiple battery cells. The cover can be removably positioned on the battery housing so that the cover is separated from the battery housing by a pressure caused by the first fire. The electric power apparatus can include a cover supported by the battery housing, and the cover can include multiple holes that permit the combustion components to pass through the cover. The electric power apparatus can include a heat absorber material supported by the battery housing, and the heat absorber material can be positioned in a path of the combustion components so that the heat absorber material absorbs first heat from a first fire in one of the multiple battery cells. The heat absorber material can include a phase change material. The electric power apparatus can include a cover removably supported by the battery housing, and the cover can include a material that absorbs second heat from the first fire, and the heat absorber material can be positioned between the cover and the multiple cell tubes. The electric power apparatus can include multiple cooling plates supported by the battery housing and thermally coupled to the multiple cell tubes, and at least one of the multiple cooling plates can include multiple holes through which the multiple cell tubes extend, the multiple cooling plates being configured to dissipate heat from the multiple cell tubes. The electric power apparatus can include a sensor configured to monitor a temperature of one of the multiple cell tubes or one of the multiple cooling plates. The electric power apparatus can include a thermal fuse mechanically and thermally coupling one of the multiple cooling plates to one of the multiple cell tubes. The multiple cooling plates can include aluminum foam. The battery housing, the multiple cell tubes, and the multiple cooling plates can evenly distribute heat so that the multiple battery cells age at a common rate. The electric power apparatus can include a plate or multiple bus bars supported by the battery housing, as well as an isolation. The plate or the multiple bus bars can electrically connect the multiple battery cells to one another and to additional battery cells of another battery housing different from the battery housing. The isolation can be positioned between (i) the plate or the multiple bus bars and (ii) the multiple cell tubes, and the isolation can provide electrical or thermal insulation. The plate or the multiple bus bars can electrically connect the multiple battery cells in parallel or series with one another. The multiple cell tubes can include aluminum, steel, or carbon. The multiple cell tubes can be arranged in at least two rows of cell tubes and at least two columns of cell tubes. The electric power apparatus can include a circuit board assembly supported by the battery housing and including a controller, and the controller can monitor one or more parameters of the multiple battery cells or control an energy transfer from the multiple battery cells to the motor. The battery housing can mechanically couple to additional battery housings on opposite sides of the battery housing, and the battery housing and the additional battery housings each have a common structure, the multiple battery cells being configured to electrically couple in series with additional battery cells of the additional battery housings to together power the motor. The additional battery housings, the additional battery housings being configured to support the additional battery cells within additional cell tubes, the additional cell tubes and the multiple cell tubes being configured to direct any combustion components from any fires from the additional battery cells and the multiple battery cells in the common direction. The electric power apparatus can include a circuit board assembly and a controller. The circuit board assembly can include a sensor configured to monitor a voltage, a current, or an internal pressure of at least one of the multiple battery cells, and the controller can be mounted on the circuit board assembly and control an energy transfer from the multiple battery cells responsive to the voltage, the current, or the internal pressure. The controller can communicate, via a connector, with an electronic device separate from the battery housing. A total number of battery cells included in the multiple battery cells is between 4 battery cells and 32 battery cells, inclusive. The electric power apparatus can be in combination with an inlet channel and an exhaust channel. The inlet channel can mechanically couple to the battery housing to direct an air flow through the battery housing and into an exhaust channel. The exhaust channel can mechanically couple to the battery housing to divert the combustion components toward an exhaust port of the vehicle housing. The electric power apparatus can be in combination with the vehicle housing. The vehicle housing can fly and support the battery housing so that an air flow passes through the battery housing toward an exhaust channel of the vehicle housing when the vehicle housing is in motion.

DETAILED DESCRIPTION

System Overview

Figure 1A:
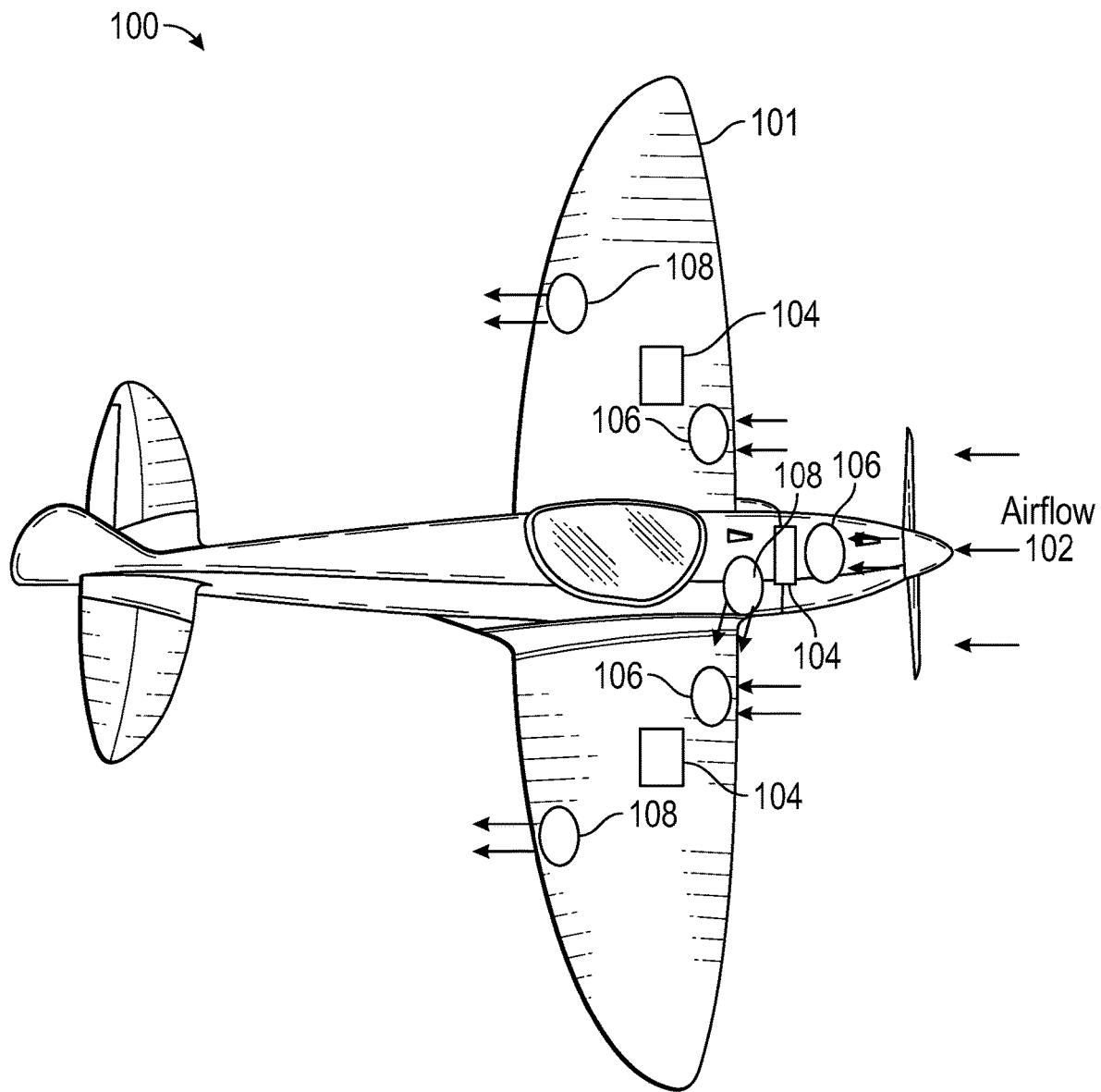
FIG. 1A illustrates an example aircraft, such as an electric or hybrid aircraft.
Figure 1B:
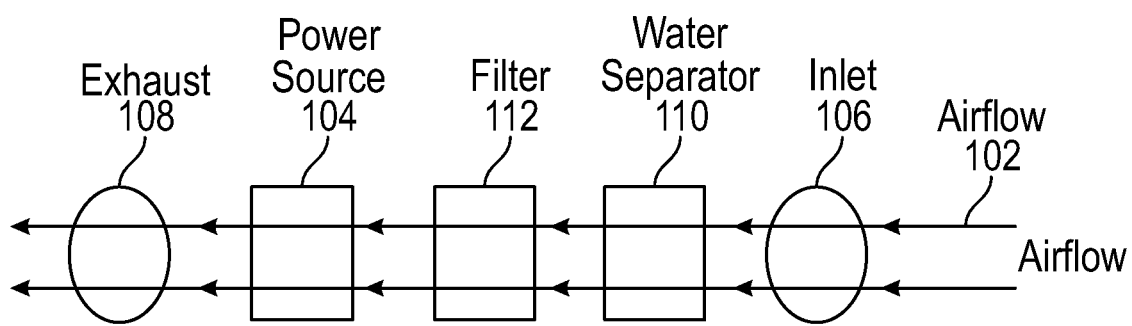
FIG. 1B illustrates airflow through the aircraft of FIG. 1A.

FIG. 1A illustrates an aircraft 100, such as an electric or hybrid aircraft, and FIG. 1B illustrates airflow 102 through the aircraft 100. The aircraft 100 has an aircraft housing 101. The aircraft 100 can include power sources 104, inlets 106, exhausts 108, one or more water separators 110, and one or more filters 112. The inlets 106 can include inlet ports proximate to an exterior of the aircraft 100 and inlet channels extending from the inlet ports into the aircraft 100. The exhausts 108 can include exhaust ports proximate to the exterior of the aircraft 100 and exhaust channels extending from the exhaust ports into the aircraft 100.

During operation of the aircraft 100 or when the power sources 104 may be supplying power, the airflow 102 can flow into the aircraft 100 from one of the inlets 106 (which can be locations of relatively higher pressure), pass in or around one or more of the power sources 104, and next pass out one of the exhausts 108 (which can be locations of relatively lower pressure). The airflow 102 can cool the one or more the power sources 104 or facilitate expulsion of heat or combustion components from the aircraft 100 in the event of a fire at the one or more of the power sources 104. The air of the airflow 102 can be filtered (for example, by one of the filters 112) as the air passes through the aircraft 100. Water or other impurities may be removed from the air (for example, by one of the one or more water separators 110) as the airflow 102 passes through the aircraft 100.

As described herein, the aircraft 100 can include an electric power system that includes integrated fire relief channels so that heat created by a fire or explosion of one of the power sources, such as the power sources 104, may be diverted through an exhaust channel to an exhaust, such as an exhaust port of the of the exhausts 108.

The aircraft 100 can include one or more components or features of aircrafts disclosed in (i) U.S. Pat. No. 10,131,246, issued Nov. 20, 2018, titled "COMMUNICATION SYSTEM FOR BATTERY MANAGEMENT SYSTEMS IN ELECTRIC OR HYBRID VEHICLES," (ii) U.S. Pat. No. 10,322,824, issued Jun. 18, 2019, titled "CONSTRUCTION AND OPERATION OF ELECTRIC OR HYBRID AIRCRAFT," (iii) Int'l Patent Application No. PCT/IB2019/053644, filed May 3, 2019, titled "AIRCRAFT MONITORING SYSTEM AND METHOD FOR ELECTRIC OR HYBRID AIRCRAFTS," (iv) Int'l Patent Application No. PCT/IB2019/055110, filed Jun. 18, 2019, titled "AIRCRAFT MONITORING SYSTEM AND METHOD FOR ELECTRIC OR HYBRID AIRCRAFTS," and (v) U.S. patent application Ser. No. 16/796,711, filed Feb. 20, 2020, titled "DRIVE SYSTEM FOR ELECTRICALLY-DRIVEN AIRCRAFT"; the entire disclosures of which are hereby incorporated by reference.

Figure 1C:
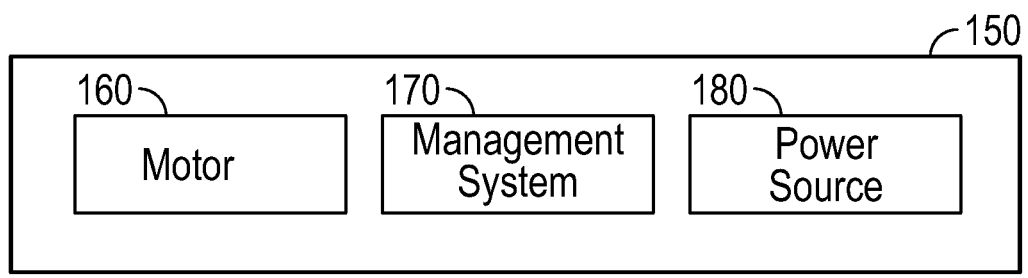
FIG. 1C illustrates a simplified block diagram of the aircraft of FIG. 1A.

FIG. 1C illustrates a simplified block diagram of an aircraft 150, which can be an implementation of the aircraft 100 of FIG. 1A. The aircraft 150 includes a motor 160, a management system 170, and a power source 180. The motor 160 can be used to propel the aircraft 150 and cause the aircraft 150 to fly and navigate. The management system 170 can control and monitor of the components of the aircraft 150, such as the motor 160 and the power source 180. The power source 180 can power the motor 160 to drive the aircraft 150 and power the management system 170 to enable operations of the management system 170. The management system 170 can include one or more controllers as well as other electronic circuitry for controlling and monitoring the components of the aircraft 150.

The motor 160 can be or include an electrical motor, such as a DC motor, a one phase AC motor, or a three phase AC motor. The motor 160 can include an electric brushless motor. The motor 160 can include more than one motor. The motor 160 can move the aircraft 150 and drive a (thrust-generating) propeller or a (lift-generating) rotor. The motor 160 can function as a generator. The motor 160 can include multiple motors, such as electric motors.

The power source 180 can store electrical energy and include one or more battery packs that each include one or more battery cells. The battery cells of a battery pack may be electrically connected in series or parallel with one another to deliver a desired voltage and current from the battery pack. Two or more battery packs can be electrically connected in series or in parallel to deliver a desired voltage and current from the two or more battery packs. The battery cells can be lithium-ion (Li-Ion) battery cells or lithium-polymer (Li—Po) battery cells.

Figure 2:
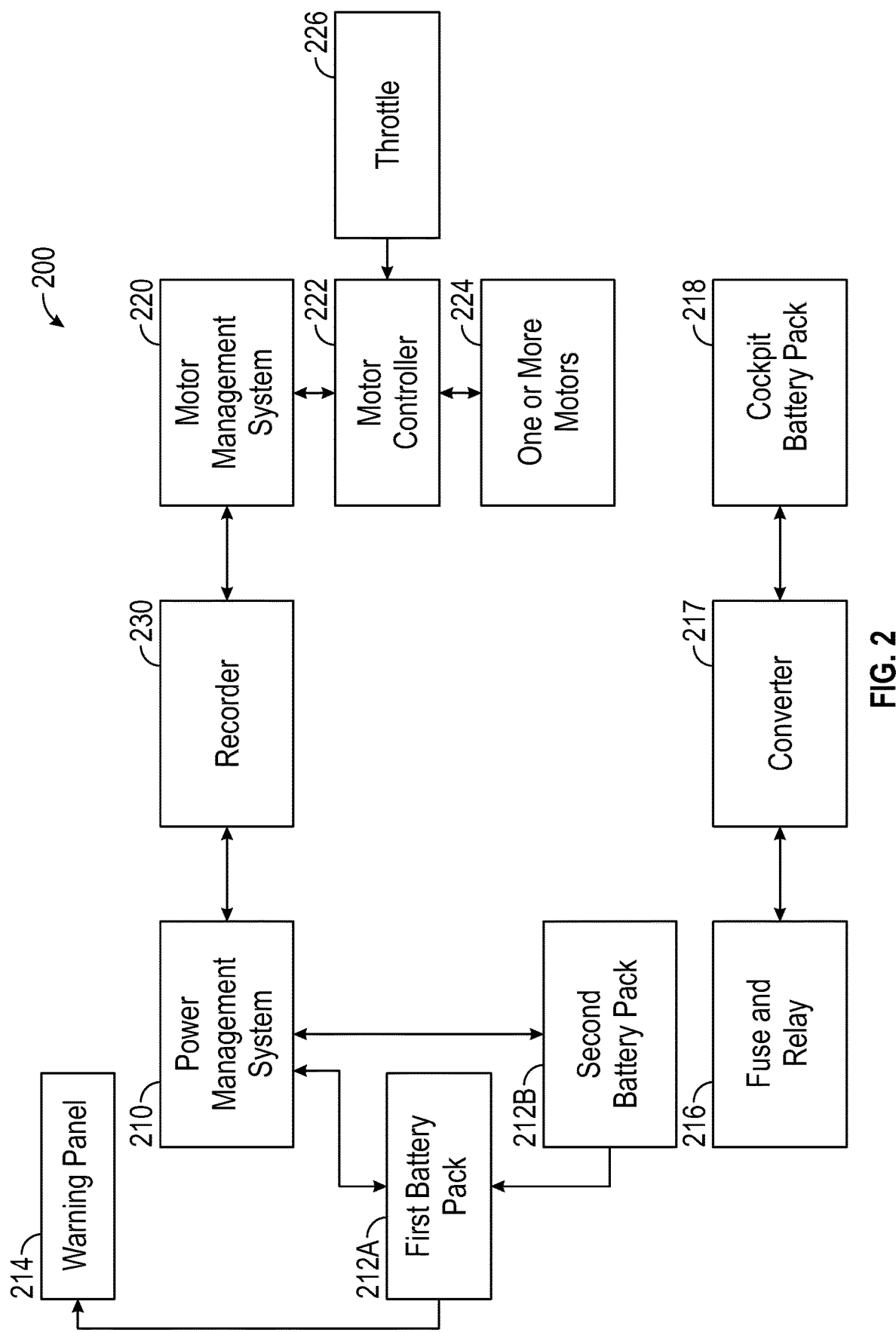
FIG. 2 illustrates an example operation system for an aircraft, such as the aircraft of FIG. 1A.

FIG. 2 illustrates an operation system 200 of an aircraft, such as the aircraft 100 of FIGS. 1A, 1B, and 1C. The operation system 200 can include a power management system 210, a motor management system 220, and a recorder 230, as well as a first battery pack 212A, a second battery pack 212B, a warning panel 214, a fuse and relay 216, a converter 217, a cockpit battery pack 218, a motor controller 222, one or more motors 224, and a throttle 226. The one or more motors 224 can be an implementation of the motor 160, the first battery pack 212A and the second battery pack 212B can be an implementation of the power sources 104 or the power source 180, and the remaining components can be an implementation of the management system 170.

The power management system 210, the motor management system 220, and the recorder 230 can monitor communications on a communication bus, such as a controller area network (CAN) bus, and communicate via the communication bus. The first battery pack 212A and the second battery pack 212B can, for instance, communicate on the communication bus enabling the power management system 210 to monitor and control the first battery pack 212A and the second battery pack 212B. As another example, the motor controller 222 can communicate on the communication bus enabling the motor management system 220 to monitor and control the motor controller 222.

The recorder 230 can store some or all data communicated (such as component status, temperature, or over/undervoltage information from the components or other sensors) on the communication bus to a memory device for later reference, such as for reference by the power management system 210 or the motor management system 220 or for use in troubleshooting or debugging by a maintenance worker. The power management system 210 and the motor management system 220 can each output or include a user interface that presents status information and permits system configurations. The power management system 210 can control a charging process (for instance, a charge timing, current level, or voltage level) for the aircraft when the aircraft is coupled to an external power source to charge a power source of the aircraft, such as the first battery pack 212A or the second battery pack 212B. Features around construction and operation of the power management system 210 are described in greater detail in U.S. Pat. No. 10,131,246, issued Nov. 20, 2018, titled "COMMUNICATION SYSTEM FOR BATTERY MANAGEMENT SYSTEMS IN ELECTRIC OR HYBRID VEHICLES," which is incorporated herein by reference.

The warning panel 214 can be a panel that alerts a pilot or another individual or computer to an issue, such as a problem associated with a power source like the first battery pack 212A. The fuse and relay 216 can be associated with the first battery pack 212A and the second battery pack 212B and usable to transfer power through a converter 217 (for example, a DC-DC converter) to a cockpit battery pack 218.

The fuse and relay 216 can protect one or more battery poles of the first battery pack 212A and the second battery pack 212B from a short or overcurrent. The cockpit battery pack 218 may supply power for the communication bus.

The motor management system 220 can provide control commands to the motor controller 222, which can in turn be used to operate the one or more motors 224. The motor controller 222 may further operate according to instructions from the throttle 226 that may be controlled by a pilot of the aircraft. Features around construction and operation of the motor management system 220 are described in greater detail in Intl Patent Application No. PCT/IB2019/055110, filed Jun. 18, 2019, titled "AIRCRAFT MONITORING SYSTEM AND METHOD FOR ELECTRIC OR HYBRID AIRCRAFTS," and U.S. patent application Ser. No. 16/796,711, filed Feb. 20, 2020, titled "DRIVE SYSTEM FOR ELECTRICALLY-DRIVEN AIRCRAFT," which are incorporated herein by reference.

The power management system 210 and the motor management system 220 can execute the same or similar software instructions and may perform the same or similar functions as one another. The power management system 210, however, may be primarily responsible for power management functions while the motor management system 220 may be secondarily responsible for the power management functions. Similarly, the motor management system 220 may be primarily responsible for motor management functions while the power management system 210 may be secondarily responsible for the motor management functions. The power management system 210 and the motor management system 220 may include the same or similar computer hardware, or a single hardware may perform both functions.

Power and Fire Management Systems

Figure 3A:
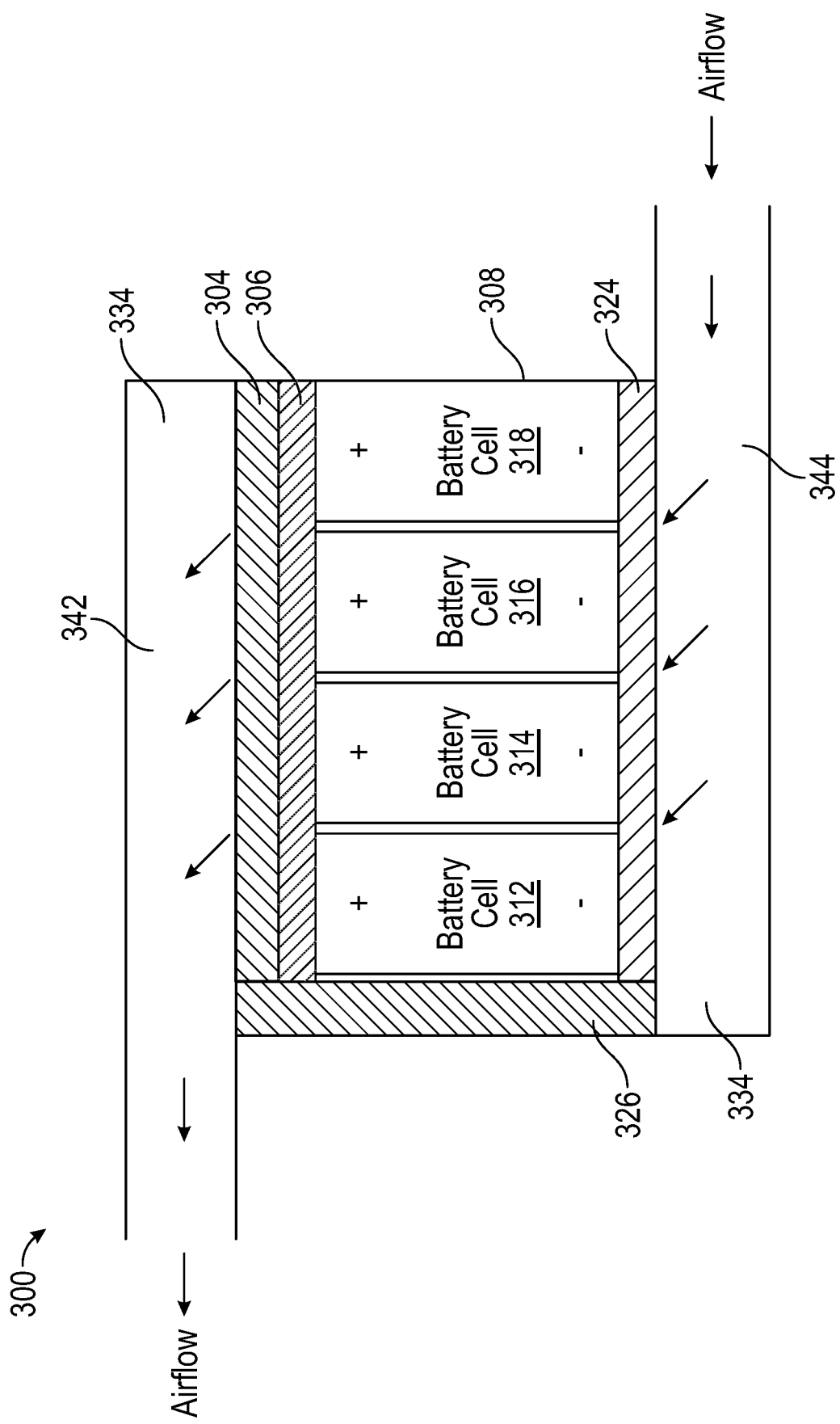
FIGS. 3A and 3B illustrate an example power system usable in a vehicle, such as the aircraft of FIG. 1A.

FIG. 3A illustrates a power system 300 usable in a vehicle, such as the aircraft 100, and prior to a fire. The power system 300 includes an exhaust channel 342, an inlet channel 344, and a battery housing 308 that supports battery cells 312, 314, 316, and 318. The exhaust channel 342 can be coupled or positioned proximate to the battery housing to prevent a fire in one of the battery cells 312, 314, 316, or 318 from spreading to another of the battery cells 312, 314, 316, or 318. The battery housing 308 and the battery cells 312, 314, 316, and 318 can together form a battery pack and be part of a power source for the vehicle, such as the power source 180.

The battery housing 308 can support a top plate 306, an insulative material 304, and the battery cells 312, 314, 316, and 318. The battery housing 308 can at least partially surround the top plate 306, the insulative material 304, and the battery cells 312, 314, 316, and 318. The battery housing 308 can be formed of or include plastic and can have an outer shape substantially shaped as a rectangular prism or cube. The battery housing 308 can support one or more additional battery cells (not shown) within the battery housing 308 and alongside the battery cells 312, 314, 316, and 318 so that the battery housing 308 may support 8, 10, 12, 16, or more battery cells, for example.

The top plate 306, the insulative material 304, and the battery cells 312, 314, 316, and 318 can be layered so that the top plate 306 (or at least a portion thereof) may be positioned between the insulative material 304 and the battery cells 312, 314, 316, and 318. In addition or alternatively, the insulative material 304 (or at least a portion thereof) can be positioned between the top plate 306 and the battery housing 308.

The top plate 306 can electrically connect the battery cells 312, 314, 316, and 318. As illustrated in FIG. 3A, the battery cells 312, 314, 316, and 318 can be oriented in the same direction such that the top plate 306 contacts or electrically connects to positive terminals of the battery cells 312, 314, 316, and 318, thereby electrically connecting the battery cells 312, 314, 316, and 318 in parallel with one another. In other implementations, the top plate 306 can contact a negative terminal of the battery cells 312, 314, 316, and 318, or one or more of the battery cells 312, 314, 316, or 318 can be oriented in an opposite direction from another of the battery cells 312, 314, 316, or 318.

Although not illustrated in FIG. 3A, multiple of the top plate 306 can be provided. For example, multiple conductive bars as top plates can each be arranged for electrically connecting a subset of the battery cells 312, 314, 316, and 318. As the multiple conductive bars may cover a smaller surface area than the top plate 306, a weight of the power system 300 can be reduced by use of the multiple conductive bars.

The top plate 306 can be electrically conductive and composed of one or more conductive materials. For example, the top plate 306 can include copper, aluminum, steel, silver, gold, zinc, nickel, iron, platinum, or a combination thereof. In other implementations, the top plate 306 may not be conductive. The top plate 306 can distribute heat evenly across the battery cells 312, 314, 316, or 318, which can allow the battery cells 312, 314, 316, or 318 to age at the same rate. The top plate 306 or at least portions thereof can withstand the temperature of a fire of one of the battery cells 312, 314, 316, and 318 so that a fire from one does not burn through the top plate 306 or the at least portions thereof. The top plate 306 may allow the fire of one of the battery cells 312, 314, 316, and 318 to pass through the top plate 306 (such as through a hole, a valve, or a weakened region in or on the top plate 306) so that the fire is directed to the exhaust channel 342 but does not reach the other of the battery cells 312, 314, 316, and 318.

The battery housing 308 can support a base plate 324 that may electrically connect negative terminals (sometimes referred to as anodes) of the battery cells 312, 314, 316, and 318. The base plate 324 can be electrically conductive and composed of one or more conductive materials, which may be similar to or the same as the top plate 306. In other implementations, the base plate 324 may not be conductive. The base plate 324 can distribute heat evenly across the battery cells 312, 314, 316, or 318, which can allow the battery cells 312, 314, 316, or 318 to age at the same rate.

As with the top plate 306, multiple of the base plate 324 can be provided although not illustrated in FIG. 3A. For example, multiple conductive bars as base plates can each be arranged for electrically connecting a subset of the battery cells 312, 314, 316, and 318. As the multiple conductive bars may cover a smaller surface area than the base plate 324, a weight of the power system 300 can be reduced by use of the multiple conductive bars.

The battery housing 308 can support a housing circuit board assembly 326. The housing circuit board assembly 326 can control the transfer power from or to the battery cells 312, 314, 316, or 318, as well as include one or more sensors for monitoring a voltage, a temperature, or an internal pressure of the battery cells 312, 314, 316, or 318 or another associated characteristic. The housing circuit board assembly 326 can provide galvanic isolation with respect to other components. Although the housing circuit board assembly 326 is illustrated on a side of the battery housing 308, the housing circuit board assembly 326 can be located or positioned elsewhere in, on, or proximate to the battery housing 308, such as one or more of its bottom or another side. The housing circuit board assembly 326 can be within or out of the path of a potential fire from the battery cells 312, 314, 316, and 318. As the housing circuit board assembly 326 may be a thermal isolator and continue to function even when positioned within a fire or in the path of the fire.

The battery cells 312, 314, 316, and 318 can store electrical energy. The electrical energy can be utilized for driving one or more motors, such as the motor 160. The one or more motors can propel a vehicle housing that is configured to fly. The battery cells 312, 314, 316, and 318 can be used to additionally or alternatively power other components supported by the vehicle housing.

The battery cells 312, 314, 316, and 318 can electrically be connected in series or in parallel to deliver a desired voltage and current. One or more of the battery cells 312, 314, 316, and 318 can be Li-Ion or Li—Po battery cells. The battery cells 312, 314, 316, and 318 can be substantially shaped as a cylinder.

The insulative material 304 can be fire retardant or not heat conductive. As illustrated, the insulative material 304 can be on top of the top plate 306 and prevent a fire from leaving the exhaust channel 342. For example, if one of battery cells 312, 314, 316, and 318 combusts and causes a fire, the fire can pass or burn through the top plate 306 or the insulative material 304 on its way into the exhaust channel 342, and after the fire enters the exhaust channel 342, the top plate 306 and the insulative material 304 can prevent the fire from leaving the exhaust channel 342 and reaching the other of the battery cells 312, 314, 316, and 318.

The top plate 306 or the insulative material 304 can include one or more holes or valves, such as one hole or valve above each of the battery cells 312, 314, 316, and 318, to permit the fire to pass through to the exhaust channel 342 but not pass back into one of the other holes or valves and into another of the battery cells 312, 314, 316, and 318. The top plate 306 or the insulative material 304 can include one or more holes or valves for allowing air to flow through the power system 300. For example, air can flow in through the inlet channel 344, pass through the battery housing 308 (for instance, around the battery cells 312, 314, 316, and 318 or from their negative to positive terminals), around or through the top plate 306 (for instance, such as through one or more holes therein) or the insulative material 304 (for instance, such as through one or more holes therein), and flow out through the exhaust channel 342. The top plate 306 or the insulative material 304 can additionally or alternatively include one or more separate regions of lower integrity (such as above each of the battery cells 312, 314, 316, and 318 and that may be prone to weakening by a fire) and higher integrity (such as not above each of the battery cells 312, 314, 316, and 318 and that may not be prone to weakening by a fire) so that a fire may weaken one region of lower integrity and then pass through the weakened region to the exhaust channel 342 but not burn through one or more other regions of lower or higher integrity and pass into another of the battery cells 312, 314, 316, and 318. The top plate 306 or the insulative material 304 can include at least some holes (for example, so that air can pass from the inlet channel 344 to the exhaust channel 342, or from the exhaust channel 342 to the inlet channel 344) and include at least some regions of lower integrity (for example, so that fire or air may pass through the top plate 306 or the insulative material 304 and exhaust through the exhaust channel 342 or the inlet channel 344).

Figure 3B:
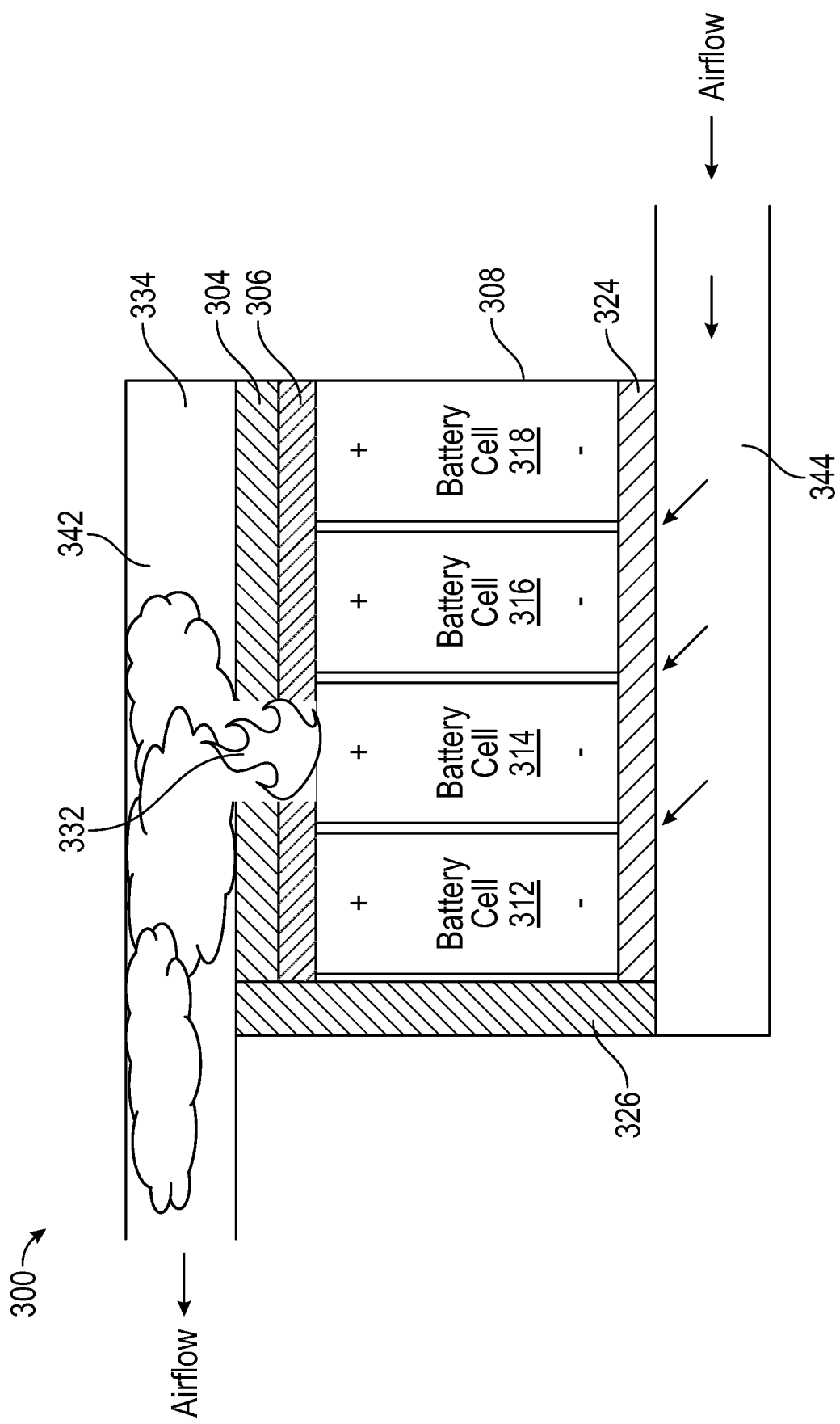

The exhaust channel 342 or the inlet channel 344 can include an at least partially enclosed space 334. As illustrated by FIG. 3B after a fire 332 in one battery cell, such as the battery cell 314, the at least partially enclosed space 334 can transfer combustion products, fumes, smoke, heat, or steam from the fire 332 toward or to an exhaust port of the vehicle housing, such as one of the exhausts 108. As illustrated, to facilitate the evacuation of the combustion products, fumes, smoke, heat, steam, or air through the exhaust channel 342, air can be funneled through the aircraft. For example, air from outside of the aircraft (for instance, in front of the aircraft) can enter through the inlet channel 344, pass at least partially around one or more of the battery cells 312, 314, 316, or 318, and exit through the exhaust channel 342 (for instance, behind the aircraft, such as behind a wing). A configuration such as this can create a vacuum for airflow, for example, where the air enters through a higher pressure inlet (for instance, the inlet channel 344) and exits through a lower pressure outlet (for instance, the exhaust channel 342). The low pressure of the exhaust channel 342 can facilitate the flow of air through the power system 300, in that the lower pressure serves to suck the air or combustion components from the exhaust channel outside of the aircraft. The power system 300 can, in some implementations, include the inlet channel 344 or the exhaust channel 342 but may not include both. The power system 300 can include a fan or other air circulating device (not shown) to facilitate the evacuation of the combustion products, fumes, smoke, heat, steam, or air through the exhaust channel 342 or into the inlet channel 344.

The battery housing 308 (as well as a vehicle housing in which the battery housing 308 may be positioned) can permit an air flow through the battery housing 308 during operation of the vehicle so that air may tend to flow from negative terminals of the battery cells 312, 314, 316, and 318 to the positive terminals. This may help to facilitate a flow of the combustion products, fumes, smoke, heat, or steam from the battery cells 312, 314, 316, and 318 into the exhaust channel 342 and towards or to one or more exhaust ports. Air flow through the battery housing 308 may additionally or alternatively cool the battery cells 312, 314, 316, or 318 as it flows through the battery housing 308. Accordingly, air flow through the power system 300 may have a dual purpose of cooling the battery cells 312, 314, 316, and 318 and facilitating the exhaust of combustion products, fumes, smoke, heat, or steam if one or more of the battery cells 312, 314, 316, and 318 catch fire. This dual purpose may be desirably performed without the additional weight of include two different systems for the purposes of cooling the battery cells 312, 314, 316, and 318 and facilitating the exhaust of combustion products, fumes, smoke, heat, or steam if one or more of the battery cells 312, 314, 316, and 318 catch fire.

Figure 3C:
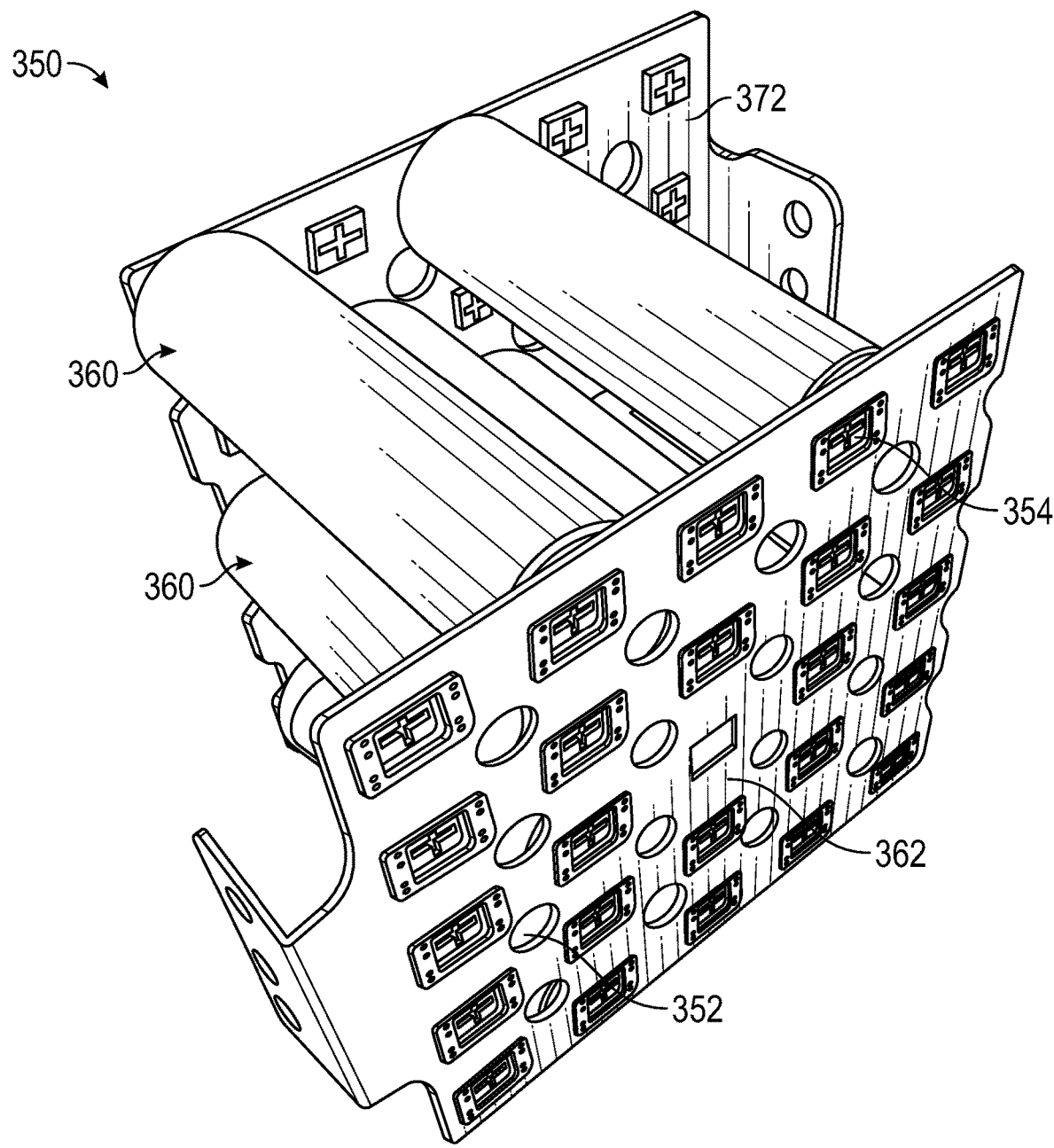
FIG. 3C illustrates example components of a power system, such as the power system of FIGS. 3A and 3B.

FIG. 3C illustrates example components of a power system 350, which can be at least a partial implementation of the power system 300 of FIGS. 3A and 3B. As shown, battery cells 360 can be positioned proximate to a top plate 362. The top plate 362 can include air outlets 352 (for instance, holes) that are positioned along spaces between the battery cells 360. The air outlets 352 can permit air to pass by the battery cells 360 as described herein. On an opposite side of the battery cells 360 from the top plate 362, a bottom plate 372 can be positioned proximate to the battery cells 360 and can be the same as or similar to the top plate 362.

Furthermore, the top plate 362 can include, or be coupled to, one or more regions of lower integrity (such as a first region of lower integrity 354), and individual regions of lower integrity may be separated from other regions of lower integrity by regions of higher integrity. The one or more regions of lower integrity can be located throughout the top plate 362, and may be positioned above the battery cells 312, 314, 316, or 318, above spaces between the battery cells, or a combination thereof. The regions of lower integrity can include a tab configured to be shifted away from a battery cell, should the battery cell explode or catch fire. The tab can include nickel, copper, or aluminum.

Figure 4:
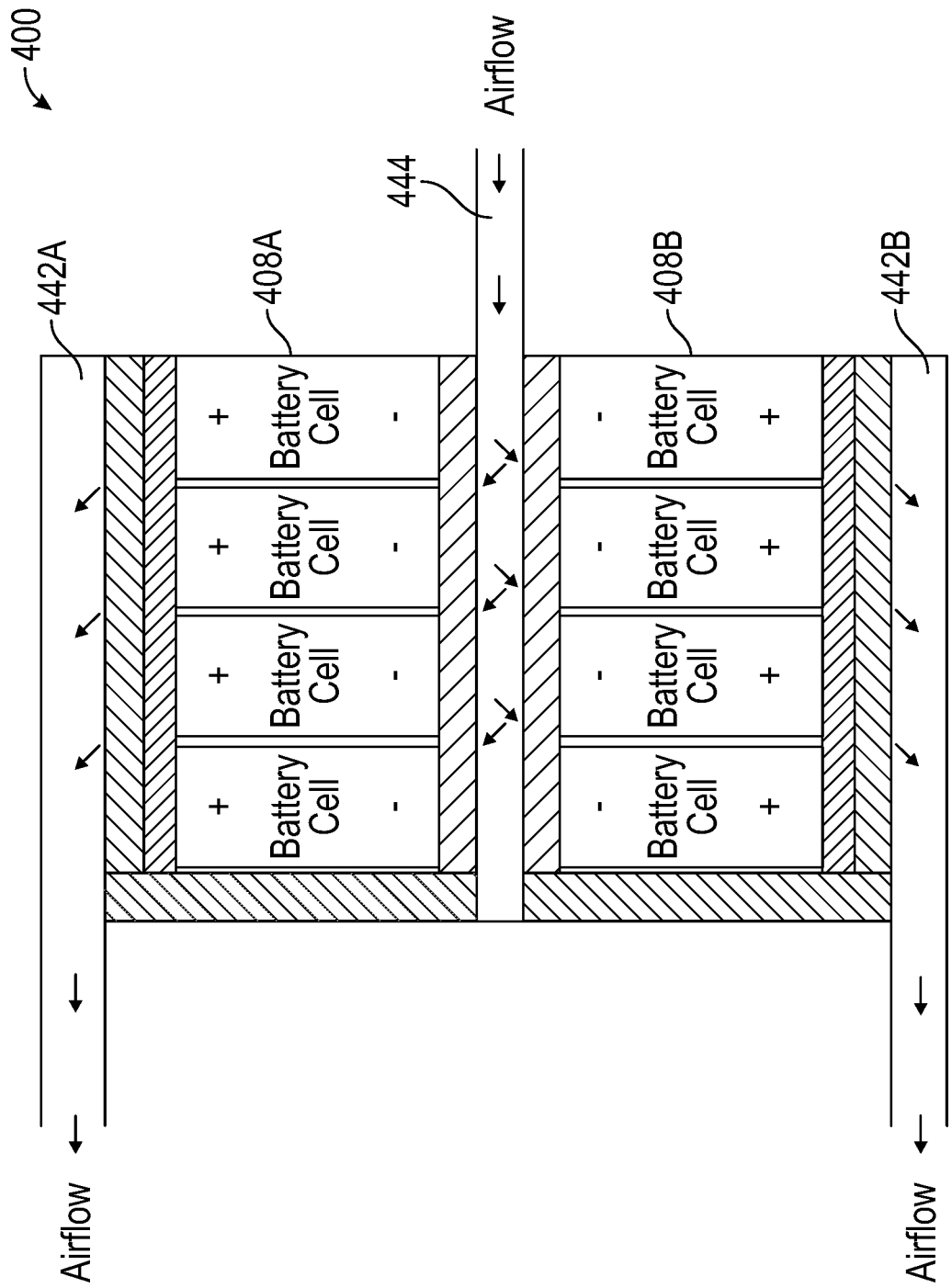
FIGS. 4 and 5 illustrate additional example power systems usable in a vehicle, such as the aircraft of FIG. 1A.

FIG. 4 illustrates a power system 400 usable in a vehicle, such as the aircraft 100. The power system 400 can be similar to the power system 300 but may include two battery housings (a first battery housing 408A and a second battery housing 408B) rather than a single battery housing (the battery housing 308) and may include two exhaust channels (a first exhaust channel 442A and a second exhaust channel 442B) rather than a single exhaust channel (the exhaust channel 342). The power system 400 may include one or more inlet channels 444 (for instance, similar to inlet channel 344) into which air can flow, such as from outside of the aircraft. The first battery housing 408A and the second battery housing 408B can each be similar to or the same as the battery housing 308 and may, although not illustrated, be physically connected to one another. The first exhaust channel 442A and the second exhaust channel 442B can each be similar to or the same as the exhaust channel 342 and divert combustion products, fumes, smoke, heat, or steam from a fire toward or to one or more exhaust ports of the vehicle housing, such as one of the exhausts 108. The battery cells of the first battery housing 408A and the second battery housing 408B can be electrically connected in parallel or series with one another and can together be part of a power source for the vehicle, such as one of the power sources 104 or the power source 180.

Figure 5:
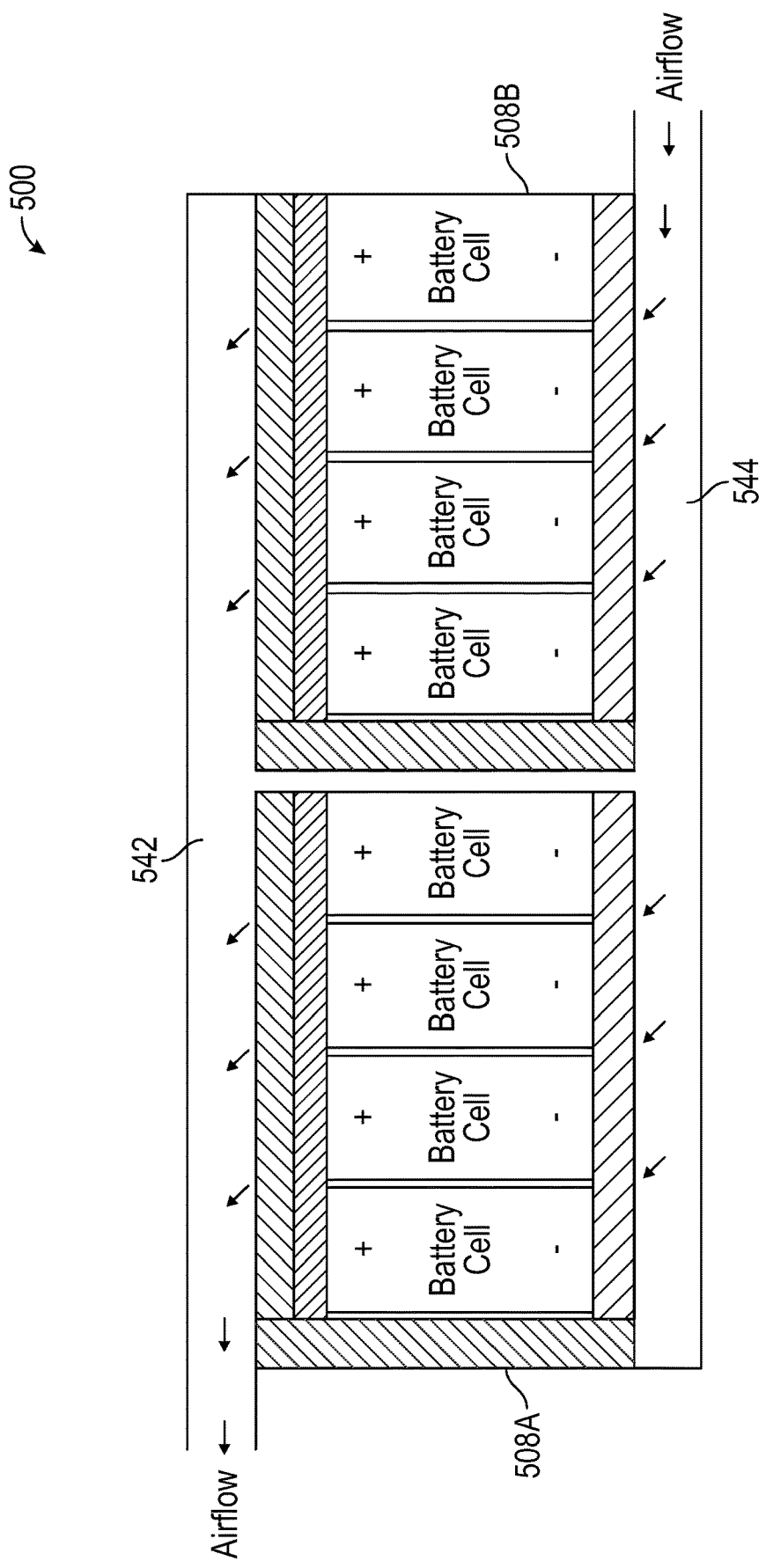

FIG. 5 illustrates a power system 500 usable in a vehicle, such as the aircraft 100. The power system 500 can be similar to the power system 300 but may include two battery housings (a first battery housing 508A and a second battery housing 508B) rather than a single battery housing (the battery housing 308) that may be coupled or positioned proximate to an exhaust channel 542 or an inlet channel 544. The first battery housing 508A and the second battery housing 508B can each be similar to or the same as the battery housing 308 and may, although not illustrated, be physically connected to one another. The exhaust channel 542 can be similar to or the same as the exhaust channel 342 and divert combustion products, fumes, smoke, heat, or steam from a fire 332 toward or to an exhaust port of the vehicle housing, such as one of the exhausts 108. The inlet channel 544 and exhaust channel 542, together with top plates or insulative materials included in the first battery housing 508A and the second battery housing 508B, can prevent a fire in one of the battery cells included in the first battery housing 508A and the second battery housing 508B from spreading to another of the battery cells included in the first battery housing 508A and the second battery housing 508B. The battery cells of the first battery housing 508A and the second battery housing 508B can be electrically connected in parallel or series with one another and can together be part of a power source for the vehicle, such as one of the power sources 104 or the power source 180.

Although FIG. 4 illustrates two physically-parallel battery housings coupled or proximate to two exhaust channels, this disclosure can be extended to additional battery housings coupled or proximate to additional exhaust channels that are physically parallel with the power system 400. Although FIG. 5 illustrates two battery housings coupled or proximate to one exhaust channel, this disclosure can be extended to additional battery housings coupled or proximate to the one exhaust channel. Moreover, the features of this paragraph can be combined to construct multiple parallel or similar exhaust channels that may individually provide cooling and divert combustion products, fumes, smoke, heat, or steam from fires in multiple battery housings toward or to one or more exhaust ports of the vehicle housing.

Figure 6A:
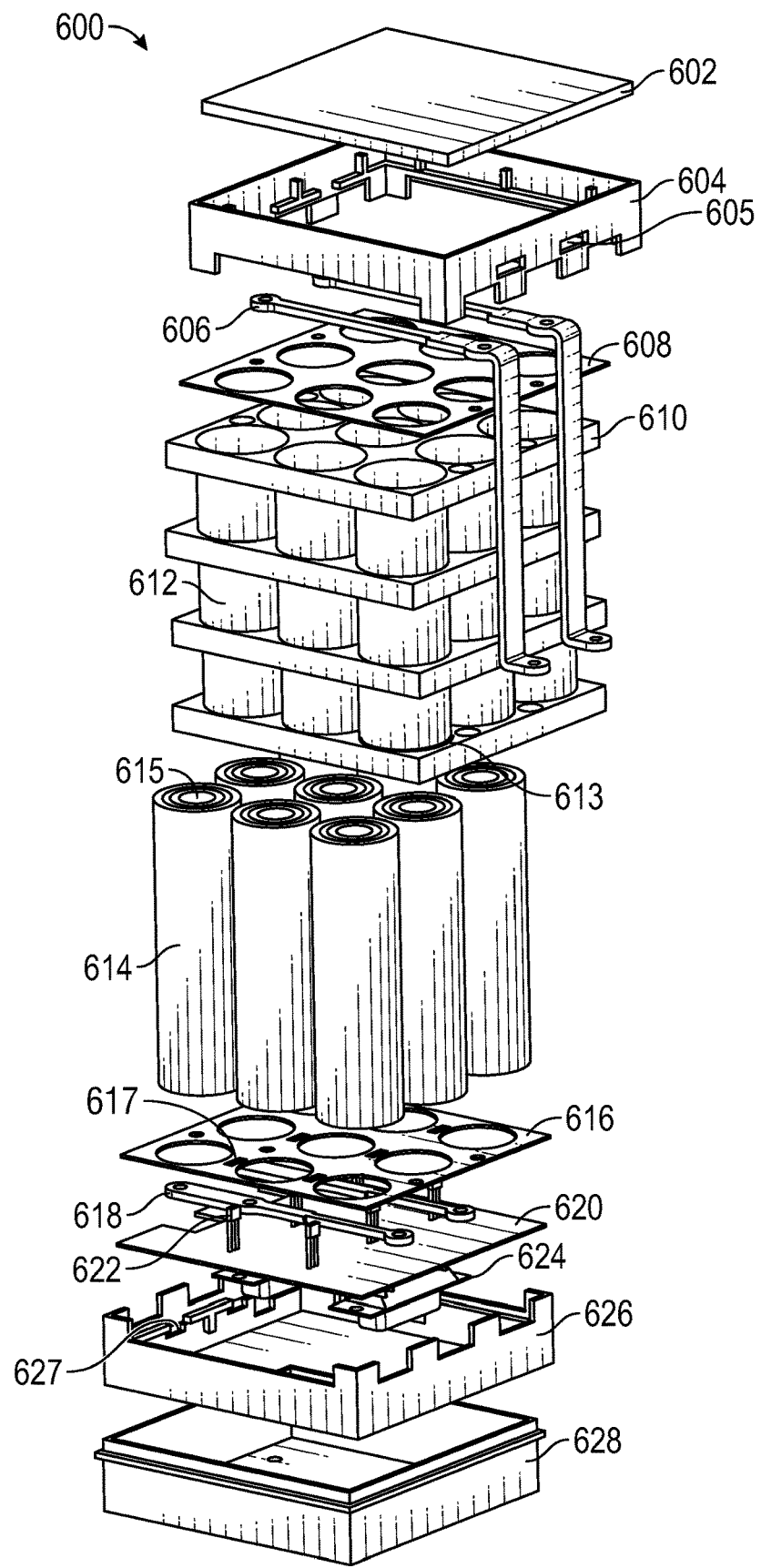
FIGS. 6A, 6B, and 6C illustrate an example battery pack usable in a vehicle, such as the aircraft of FIG. 1A.

FIG. 6A illustrates a battery pack 600 that can be part of a power source, such as one of the power sources 104 or the power source 180, for a vehicle. The battery pack 600 may be used in place of or alongside one or more of the battery packs described with respect to FIGS. 3A, 3B, 4, and 5. The battery pack 600 can be constructed to facilitate a controlled expulsion of heat or combustion components from a battery cell of the battery pack 600 that catches fire so that the heat or combustion components do not reach one or more other battery cells of the battery pack 600 or another component of the vehicle that may be unable to withstand the heat or combustion components. The battery pack 600 can desirably prevent, by energy absorption or dissipation, the one or more other battery cells of the battery pack 600 from reaching a temperate of more than 120° C., which may avoid a chain reaction of starting fires in the one or more other battery cells of the battery pack 600.

The battery pack 600 can include a top cover 602, a top housing 604, multiple top bus bars (including a top bus bar 606), a top isolation 608, multiple cooling plates (including a cooling plate 610), multiple cell tubes (including a cell tube 612), a thermal fuse 613, multiple battery cells (including a battery cell 614), a bottom isolation 616, multiple bottom bus bars (including a bottom bus bar 618), a pack circuit board assembly 620, multiple sensors (including a sensor 622), multiple connectors (including a connector 624), a bottom housing 626, and a bottom cover 628. The battery pack 600 can be constructed so that one or more components of the battery pack 600 may distribute heat evenly and allow the multiple battery cells age at the same rate.

The top cover 602 can be or include a thermal conductive foam, a phase-change material, a plastic, or a thin tape layer. The top cover 602 can positioned within the top housing 604 so that the top housing 604 is around a perimeter of the top cover 602. The top cover 602 can be positioned on one or more flanges on the top housing 604, the multiple top bus bars of the battery pack 600, or the top isolation 608. The top cover 602 may not be attached to the top housing 604 or may instead be attached to the top housing 604 on one or more sides, such as by a hinge, a fastener, a glue, or a tension-fit. If the top cover 602 is attached to the top housing 604, the top cover 602 may be loosely attached to the top housing 604 to facilitate relatively easy movement of at least part of the top cover 602 away from at least part of the top housing 604, such as responsive to pressure from heat or combustion components from one of the multiple battery cells of the battery pack 600. The top cover 602 may be relatively lightweight to facilitate relatively easy movement of at least part of the top cover 602 away from at least part of the top housing 604, such as responsive to pressure from heat or combustion components from one of the multiple battery cells of the battery pack 600.

The top cover 602 can absorb some heat and energy released from one or more of the multiple battery cells of the battery pack 600 upon the one or more of the multiple battery cells catching fire. The remainder of the heat and energy released can be released in an exhaust channel, such as described herein.

The top housing 604, the bottom housing 626, and the bottom cover 628 can be or include a plastic. The plastic can be flame retardant. The top housing 604 and the bottom housing 626, as well as the bottom cover 628, can provide structural support for the other components of the battery pack 600 and may facilitate dissipation of heat.

The top housing 604, the bottom housing 626, and the bottom cover 628 or at least portions thereof can withstand the temperature of a fire of one of the multiple battery cells of the battery pack 600 so that so that a fire from one does not burn through. Moreover, the top housing 604, the bottom housing 626, and the bottom cover 628 can continue to provide structural support despite the fire of one of the multiple battery cells of the battery pack 600.

The top housing 604 and the bottom housing 626 can together provide the battery pack 600 an external shape of a rectangular prism or cube. The top housing 604 and the bottom housing 626 can have the same or similar structures such that the top housing 604 and the bottom housing 626 can be used in place of one another. The top housing 604 and the bottom housing 626 can together form a battery housing for the battery pack 600.

The top isolation 608 and the bottom isolation 616 can each be an isolation layer and provide electrical or thermal insulation. The top isolation 608 and the bottom isolation 616 can be or include a glass fiber. The top isolation 608 can serve to prevent heat or combustion components on one side of the top isolation 608 from reaching the other side of the top isolation 608. The bottom isolation 616 can serve to prevent heat or combustion components on one side of the bottom isolation 616 from reaching the other side of the bottom isolation 616. The top isolation 608 and the bottom isolation 616 can include holes in which the multiple cell tubes, including the cell tube 612, may be positioned. The top isolation 608 and the bottom isolation 616 can have the same or similar structures such that the top isolation 608 and the bottom isolation 616 can be used in place of one another.

The multiple cooling plates of the battery pack 600 can include a total of four cooling plates as illustrated. In other implementations, the battery pack 600 may instead include one, two, four, five, six, or more cooling plates. The multiple cooling plates, including the cooling plate 610, can thermally conductive to dissipate heat. The multiple cooling plates can attempt to maximize a heat exchange surface with air to expedite the dissipation of heat. One or more of the multiple cooling plates may be or include an aluminum foam or another more or less thermally conductive material. One or more of the multiple cooling plates may be composed of a different material from one or more other of the multiple cooling plates to facilitate different rates of heat dissipation between the multiple cooling plates. At least some of each of the multiple cooling plates can have the same or similar structures so that the at least some of each of the multiple cooling plates may be used in place of one another.

One of the multiple cooling plates, such as the cooling plate 610, or the top isolation 608 can be positioned on one or more flanges on the top housing 604. The one or more flanges on the top housing 604 can assist with aligning the one of the multiple cooling plates or the top isolation 608 within an inner area of the top housing 604 and supporting the structure of the battery pack 600.

One or more of the multiple cooling plates can include holes in which the multiple cell tubes, including the cell tube 612, may be positioned so that the multiple cooling plates may support and dissipate heat from the multiple cell tubes. The multiple cooling plates may be thermally coupled and rigidly fixed to the multiple cell tubes. In certain implementations, the multiple cooling plates and the multiple cell tubes can be part of the same single structure or have the same composition. The multiple cell tubes can be or include aluminum, steel, or carbon. Individual of the multiple cell tubes can be constructed so that heat or combustion components generated therein may be directed toward the top cover 602 rather than radially outwards through a wall of the cell tube. Individual of the multiple cell tubes can be open on one end or both ends.

Although the multiple cell tubes of the battery pack 600 may be illustrated as having a cylindrical shape, one or more of the multiple cell tubes can each have another shape that may be used to house one of the multiple battery cells. The structure of the another shape or the cylindrical shape can be such that individual of the multiple cell tubes may prevent a direct line of sight from a housed one of the multiple battery cells to one or more or all neighboring of the multiple battery cells. Moreover, the structure of the another shape or the cylindrical shape can be such that individual of the multiple cell tubes may reverberate heat or combustion components from an inner surface to keep the heat or combustion components from reaching other of the multiple cell tubes.

The multiple cell tubes of the battery pack 600 can include a total of nine cell tubes as illustrated. In other implementations, the battery pack 600 may instead include a total of 2·N or 3·N cell tubes where N is an integer. The multiple cell tubes can be arranged in one or more rows (such as two, three, four, or more rows) and one or more columns (such as two, three, four, or more columns). At least some of each of the multiple cell tubes can have the same or similar structures so that the at least some of each of the multiple cell tubes may be used in place of one another.

The battery pack 600 can include one or more thermal fuses, such as the thermal fuse 613. Individual of the thermal fuses can decouple one of the multiple cooling plates from one of the multiple cell tubes responsive to a thermal runaway, such as if a fire starts within or proximate to the one of the multiple cell tubes. Although the battery pack 600 is shown as including just the thermal fuse 613, thermal fuses may be positioned between at least 20%, 25%, 30%, 40%, 50%, 60%, 70%, 75%, 80%, 90% or all of the multiple cell tubes and the multiple cooling plates of the battery pack 600.

The multiple battery cells, including the battery cell 614, of the battery pack 600 can store electrical energy. The electrical energy can be utilized for driving one or more motors, such as the motor 160. The one or more motors can propel a vehicle housing that is configured to fly. The multiple battery cells can be used to additionally or alternatively power other components supported by the vehicle housing.

The multiple battery cells of the battery pack 600 or subsets thereof can be electrically connected in series or parallel with one another to deliver a desired voltage and current. As illustrated in FIG. 6A, for example, all of the multiple battery cells can be electrically connected in parallel with one another. One or more of the multiple battery cells can be Li-Ion or Li—Po battery cells. Individual of the multiple battery cells may be self-contained and be an off-the-shelf battery cell. The multiple battery cells can be substantially shaped as a cylinder. At least some of each of the multiple battery cells can have the same or similar structures so that the at least some of each of the multiple battery cells may be used in place of one another.

Individual of the multiple battery cells of the battery pack 600 can provide a current of 5 A, 10 A, 15 A, 20 A, 25 A, 30 A, 35 A, 40 A, 45 A, or 50 A or within a range defined by two of the foregoing values or another value greater or less than the foregoing values. Individual of the multiple battery cells can provide a voltage of 3.0 V, 3.2 V, 3.4 V, 3.5 V, 3.6 V, 3.8 V, 4.0 V, 4.2 V, 4.4 V, 4.5 V, 4.6 V, 4.8 V, or 5.0 V or within a range defined by two of the foregoing values or another value greater or less than the foregoing values. Individual of the multiple battery cells can provide an energy output of 5 Wh, 10 Wh, 15 Wh, 20 Wh, 25 Wh, 30 Wh, 35 Wh, 40 Wh, 45 Wh, 50 Wh, 55 Wh, 60 Wh, 65 Wh, 70 Wh, 75 Wh, 80 Wh, 85 Wh, 90 Wh, 95 Wh, or 100 Wh or within a range defined by two of the foregoing values or another value greater or less than the foregoing values. Individual of the multiple battery cells of the battery pack 600 can have a height of 40 mm, 45 mm, 50 mm, 55 mm, 60 mm, 65 mm, 70 mm, 75 mm, or 80 mm or within a range defined by two of the foregoing values or another value greater or less than the foregoing values. Individual of the multiple battery cells of the battery pack 600 can have a diameter of 10 mm, 11 mm, 12 mm, 13 mm, 14 mm, 15 mm, 16 mm, 17 mm, 18 mm, 19 mm, 20 mm, 21 mm, 22 mm, 23 mm, 24 mm, 25 mm, 26 mm, 27 mm, 28 mm, 29 mm, or 30 mm or within a range defined by two of the foregoing values or another value greater or less than the foregoing values.

Individual of the multiple battery cells of the battery pack 600 can be positioned within individual of the multiple cell tubes, as well as removed from individual of the multiple cell tubes. The fit of the individual of the multiple battery cells of the battery pack 600 within the individual of the multiple cell tubes can, for instance, be a loose fit or a light interference fit. The multiple battery cells can be arranged in the multiple cell tubes so that positive terminals, such as a positive terminal 615, may be directed toward the top cover 602 rather than the bottom cover 628. Alternatively, one or more of the multiple battery cells can be arranged in the multiple cell tubes so that negative terminals may be directed toward the top cover 602 rather than the bottom cover 628.

The multiple top bus bars (sometimes referred to as multiple top plates), including the top bus bar 606, can be used to electrically connect two or more terminals of the multiple battery cells of the battery pack 600. For example, where the multiple battery cells can be arranged in the multiple cell tubes so that positive terminals are directed toward the top cover 602, the multiple top bus bars can electrically connect the positive terminals to one another, such as via top wire bonding 804 shown in FIG. 8B (such as aluminum wire bonding) or instead via spot welding. If the multiple top bus bars may be connected via the top wire bonding 804, the top wire bonding 804 can function as a fuse and decouple its mechanical, electrical, and thermal connection responsive to a high temperature condition or a high electrical current condition.

The multiple top bus bars of the battery pack 600 can include a total of two top bus bars as illustrated in FIG. 6A. In other implementations, the battery pack 600 may instead include one, three, four, five, six, or more top bus bars. The battery pack 600 may include one fewer top bus bar than a number of rows in the battery pack 600 so that one top bus bar can extend between each row of the multiple battery cells of the battery pack 600. At least some of each of the multiple top bus bars can have the same or similar structures so that the at least some of each of the multiple top bus bars may be used in place of one another.

The multiple top bus bars can be attached to the top isolation 608 and at least one of the multiple cooling plates, such as the cooling plate 610, to support and fix the multiple top bus bars. The multiple top bus bars can be attached to the top isolation 608 and the at least one of the multiple cooling plates via, as suggested by FIG. 6A, fasteners positioned in fixation holes in the top isolation 608 and the cooling plate 610 and isolation connector holes in the multiple top bus bars or instead via an adhesive. The multiple top bus bars can be positioned between the top isolation 608 and the top cover 602.

The multiple top bus bars may extend through top bus bar extension holes, such as a top bus bar extension hole 605, in the top housing 604 so that the top housing 604 can support and fix the multiple top bus bars. Once the multiple top bus bars extend through the bus bar extension holes, the multiple top bus bars may adjust direction (such as by 90°) and extend along a length of the multiple cell tubes of the battery pack 600. The multiple top bus bars may extend along the length of the multiple cell tubes of the battery pack 600 in order to mechanically (for example, via one or more fasteners or an adhesive) and electrically connect to a bottom bus bar of another battery pack (not shown in FIG. 6A). The multiple battery cells of the battery pack 600 can be electrically in series or parallel with the multiple battery cells of the another battery pack. In one example, the multiple battery cells of the battery pack 600 can be electrically connected in series with the multiple battery cells of the another battery pack so that a combined voltage output from the battery pack 600 and the another battery pack may provide a desired voltage level.

The multiple bottom bus bars (sometimes referred to as multiple bottom plates), including the bottom bus bar 618, can be used to electrically connect two or more terminals of the multiple battery cells of the battery pack 600. For example, where the multiple battery cells can be arranged in the multiple cell tubes so that positive terminals are directed toward the top cover 602, the multiple bottom bus bars can electrically connect negative terminals of the multiple battery cells to one another, such as via bottom wire bonding 630 shown in FIG. 6B (such as aluminum wire bonding) or instead via spot welding. If the multiple bottom bus bars may be connected via the bottom wire bonding 630, the bottom wire bonding 630 can function as a fuse and decouple its mechanical, electrical, and thermal connection responsive to a high temperature condition or a high electrical current condition.

The multiple bottom bus bars of the battery pack 600 can include a total of two bottom bus bars as illustrated. In other implementations, the battery pack 600 may instead include one, three, four, five, six, or more bottom bus bars. The battery pack 600 may include one fewer bottom bus bar than a number of rows in the battery pack 600 so that one bottom bus bar can extend between each row of the multiple battery cells of the battery pack 600.

The multiple bottom bus bars can be attached to the bottom isolation 616 and at least one of the multiple cooling plates to support and fix the multiple bottom bus bars. The multiple bottom bus bars can be attached to the bottom isolation 616 and the at least one of the multiple cooling plates via, as suggested by FIG. 6A, fasteners positioned in fixation holes in the bottom isolation 616 and the at least one of the multiple cooling plate and isolation connector holes in the multiple bottom bus bars or instead via an adhesive. The multiple bottom bus bars can be positioned between the bottom isolation 616 and a circuit board of the pack circuit board assembly 620.

Figure 7:
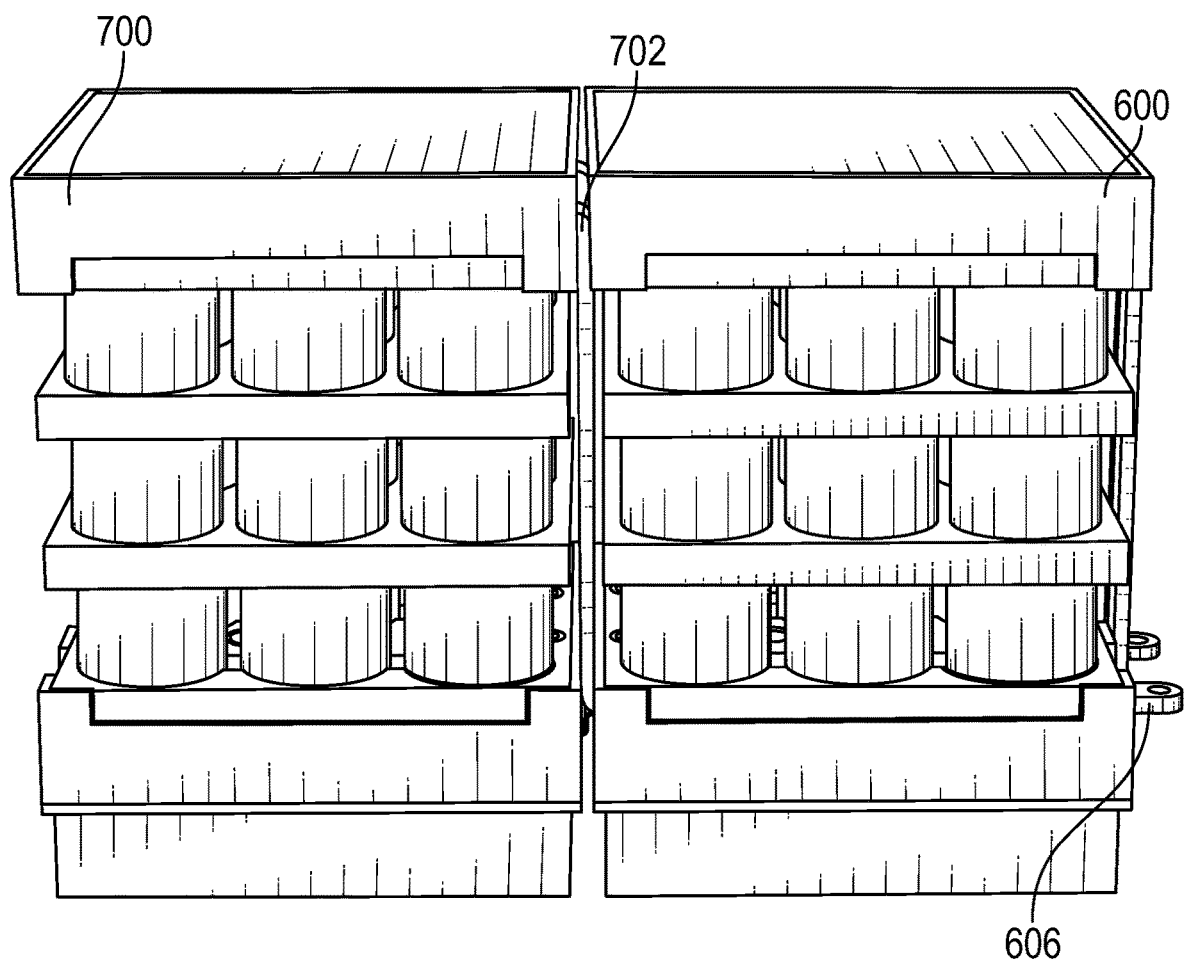
FIG. 7 illustrates example connected battery packs usable in a vehicle, such as the aircraft of FIG. 1A.

The multiple bottom bus bars can, as shown in FIG. 7, mechanically (for example, via one or more fasteners or an adhesive) and electrically connect to another top bus bars, such as another top bus bar 702, of a different battery pack 700. The another top bus bars can extend through multiple bottom bus bar extension holes, such as a bottom bus bar extension hole 627, in the bottom housing 626. The mechanical connections can fix the battery pack 600 to the different battery pack 700. The multiple battery cells of the battery pack 600 can be electrically in series or parallel with the multiple battery cells of the different battery pack 700. Where the structure of the different battery pack 700 may be the same or similar to the structure of the battery pack 600, the different battery pack 700 and the battery pack 600 can, for instance, be connected in series with one another. The different battery pack 700 and the battery pack 600 can be electrically connected in series with the multiple battery cells of the another battery pack so that a combined voltage output from the battery pack 600 and the another battery pack may provide a desired voltage level.

Although FIG. 7 illustrates two battery packs mechanically and electrically connected, one or more additional battery packs can be similarly mechanically and electrically connected. For example, three, four, five, six, seven, eight, nine, ten, or more battery packs can be similarly mechanically and electrically connected to together in a row to form a power source having a greater performance capability (such as a greater voltage, current, or power output) than an individual one of the battery packs or a subset of the battery packs.

The multiple top bus bars and the multiple bottom bus bars of the battery pack 600 can be or include aluminum, copper, or another conductive material. Although the multiple top bus bars and the multiple bottom bus bars of the battery pack 600 are shown as bars, the bars may instead be plates in other implementations.

The pack circuit board assembly 620 can include one or more controllers that may control the transfer of energy from or to the multiple battery cells of the battery pack 600 or may monitor one or more parameters of the multiple battery cells. The pack circuit board assembly 620 can include multiple sensors for monitoring a voltage, a current, a temperature, or an internal pressure of the multiple battery cells. The one or more controllers can be in electrical communication with the multiple sensors to permit the one or more controllers to monitor at least some of the one or more parameters with the multiple sensors. The multiple sensors can include one or more sensors, such as the sensor 622, which may extend from the pack circuit board assembly 620 and physically pass through sensor holes, such as a sensor hole 617, in the bottom isolation 616 to permit the one or more sensors to detect one or more temperatures proximate to or on one or more of the multiple cell tubes or multiple cooling plates of the battery pack 600. The one or more controllers can control operations of the battery pack 600 and transfer of energy from or to the multiple battery cells at least according to sensor data generated by the multiple sensors. For example, the one or more controllers can shut down power generation by the battery pack 600 or trigger an alarm responsive to a detected high temperature condition by one of the multiple sensors.

The pack circuit board assembly 620 can be positioned within the bottom housing 626 so that the bottom housing 626 is around a perimeter of the pack circuit board assembly 620. The multiple cell tubes of the battery pack 600, the bottom isolation 616, the multiple bottom bus bars, the bottom housing 626 and the bottom cover 628 may together enclose the pack circuit board assembly 620.

The pack circuit board assembly 620 can provide galvanic isolation with respect to other components. The pack circuit board assembly 620 can be out of the path of a fire from one or more of the multiple battery cells. Although the pack circuit board assembly 620 may no longer function to control the transfer power from or to the multiple battery cells upon occurrence of a fire in one or more of the multiple battery cells, the pack circuit board assembly 620 may continue to serve as a thermal insulator.

The multiple connectors, including the connector 624, of the battery pack 600 can be mechanically and electrically connected to the pack circuit board assembly 620. The multiple connectors can be used by the one or more controllers of the pack circuit board assembly 620 to receive data from outside the battery pack 600 or transmit data outside the battery pack 600. The one or more controllers can receive commands via one or more of the multiple connectors. The commands can, for instance, be used by the one or more controllers to set an operating mode for the battery pack 600 or configuration settings (such as an operating power level or permissible operating temperature limit) for the battery pack 600. The one or more controllers can, for instance, transmit operating status or logs, sensor data detected by the multiple sensors, or alarms via one or more of the multiple connectors.

The multiple connectors can include a total of two connectors as illustrated. In other implementations, the battery pack 600 may instead include one, three, four, five, six, or more connectors. Where the multiple connectors of the battery pack 600 may include a total of two connectors as illustrated, one of the multiple connectors can be input connector for receiving data and the other of the multiple connectors can be input connector for transmitting data. Alternatively, both of the multiple connectors can function to input and output data and may, for example, communicate via separate communication channels, such as with redundant controllers. At least some of each of the multiple connectors can have the same or similar structures so that the at least some of each of the multiple connectors may be used in place of one another. One or more of the multiple connectors may be a serial bus connector. Although the multiple connectors are illustrated as female connectors in FIG. 6B, the multiple connectors can be male or female connectors.

Figure 6B:
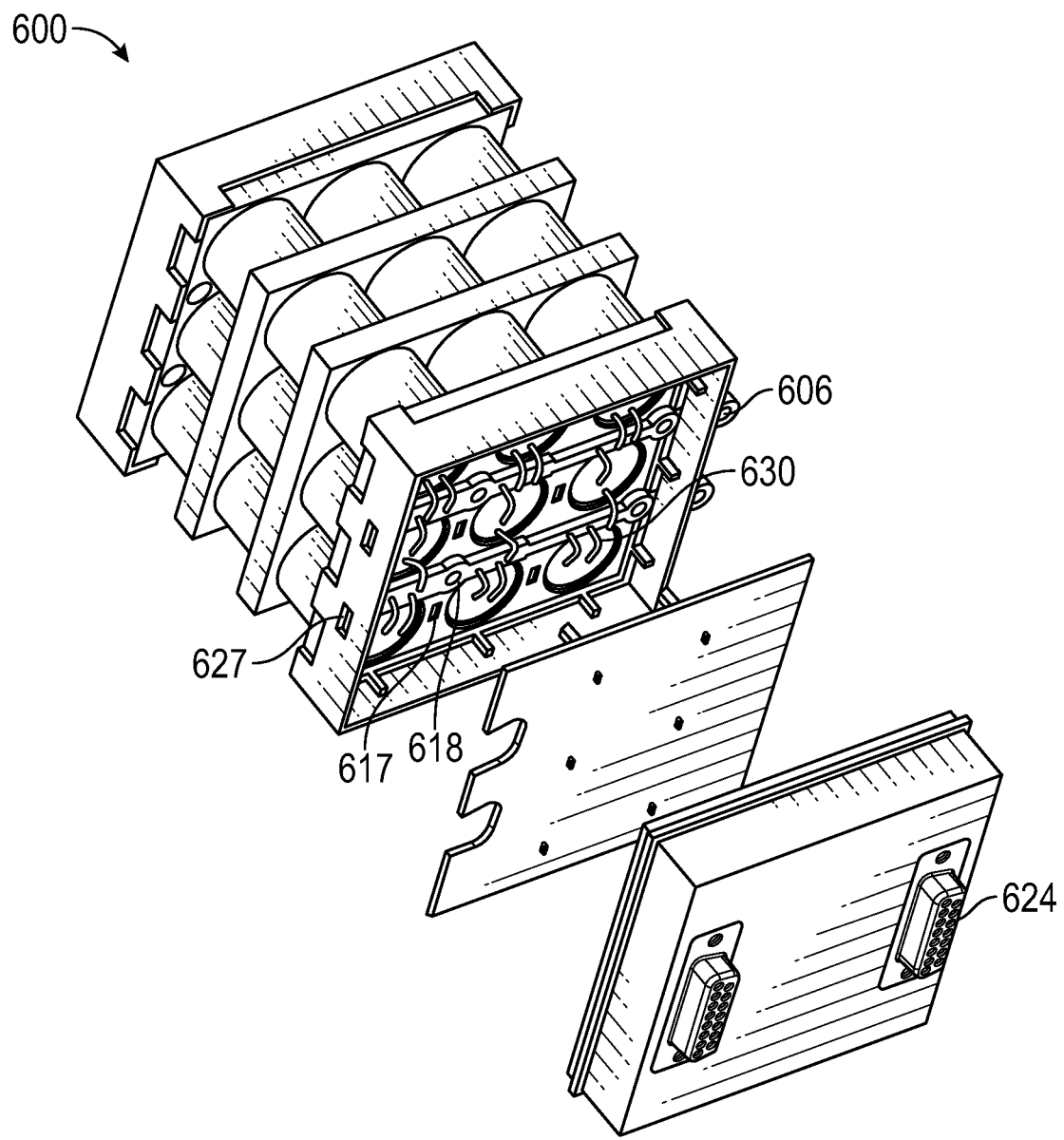

The multiple connectors, including the connector 624, of the battery pack 600 can be mechanically connected to and supported by the bottom cover 628. The multiple connectors can be positioned on a side of the bottom cover 628 opposite the pack circuit board assembly 620 as illustrated in FIG. 6B.

One of the multiple cooling plates, such as a cooling plate closest to the bottom housing 626, or the bottom isolation 616 can be positioned on one or more flanges on the bottom housing 626. The one or more flanges on the bottom housing 626 can assist with aligning the one of the multiple cooling plates or the bottom isolation 616 within an inner area of the bottom housing 626 and supporting the structure of the battery pack 600.

The bottom housing 626 can be attached to the bottom cover 628 to enclose and protect the pack circuit board assembly 620 and its mechanical and electrical connections. The bottom housing 626 can, for instance, be attached to the bottom cover 628 via a hinge, a fastener, a glue, or a tension-fit.

Figure 6C:
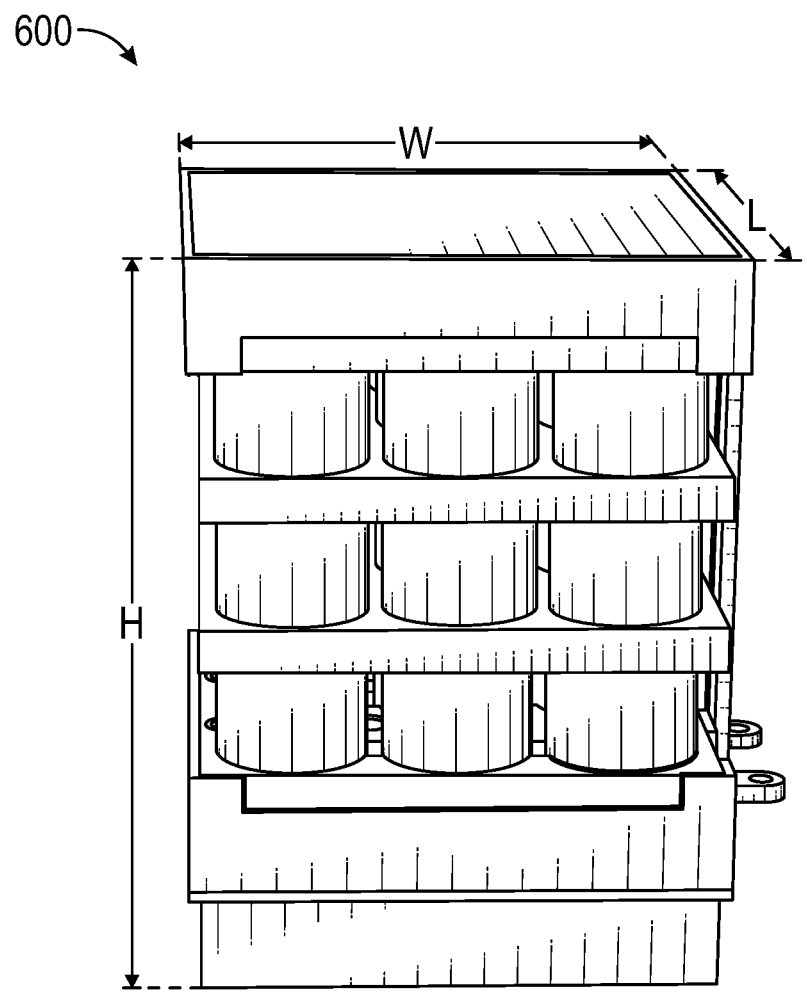

The battery pack 600 can have a length of L, a width of W, and a height of H as shown in FIG. 6C. The length of L, the width of W, or the height of H can each be 50 mm, 65 mm, 80 mm, 100 mm, 120 mm, 150 mm, 200 mm, 250 mm, 300 mm, 350 mm, 400 mm, 450 mm, or 500 mm or within a range defined by two of the foregoing values or another value greater or less than the foregoing values. For example, L can be around 80 mm, W can be around 80 mm, and H can be around 100 mm.

The battery pack 600 may include fewer or additional components in some implementations. For example, the battery pack 600 may not include the top cover 602 in certain implementations. As another example, the battery pack 600 can include a heat absorber material (not shown in FIG. 6A), such as a phase change material, a gel, or the like, between the top cover 602 and the top isolation 608 to absorb heat and energy upon the one or more of the multiple battery cells of the battery pack 600 catching fire and which may help the fire from reaching the other of the multiple battery cells.

The battery pack 600 can be constructed and positioned, such as in a vehicle, so that air may flow by the battery pack 600 in a direction from the bottom cover 628 to the top cover 602 or may circulate from one side of the battery pack 600 to another side. The air flowing by the battery pack 600, such as from an inlet channel as described herein, can cool the multiple battery cells of the battery pack 600, as well as be used to expel any combustion products, fumes, smoke, heat, or steam from the battery pack 600. After the air passes by the battery pack 600, the air may be transferred to an exhaust, such as an exhaust channel as described herein. Such construction and positioning of the battery pack 600 may advantageously permit cooling of the multiple battery cells and expelling of any combustion products, fumes, smoke, heat, or steam with a single combined system rather than utilizing two different systems that may add additional weight.

Figure 8A:
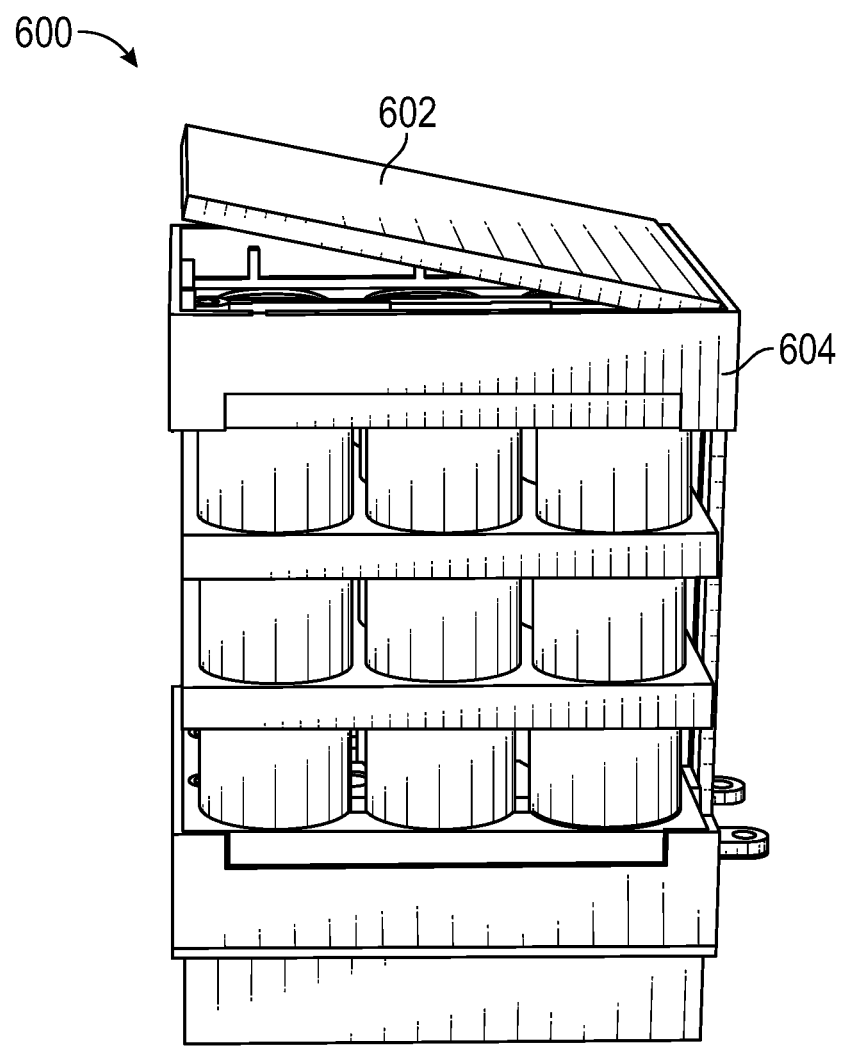
FIGS. 8A and 8B illustrate an example battery pack, such as the battery pack of FIGS. 6A, 6B, and 6C, upon failure of a battery cell.

FIG. 8A illustrates the battery pack 600 shortly after one of the multiple battery cells of the battery pack 600 catches fire and begins a thermal runaway. The top cover 602 can absorb some of the energy released by the fire. Additionally, the top cover 602 can be moved, as shown in FIG. 8A, by a pressure difference between (i) a pressure in a cell tube of the one of the multiple battery cells that caught fire and (ii) a pressure on a side of the top cover 602 opposite the cell tube of the one of the multiple battery cells that caught fire. The fire and the generated combustion components may reach a temperature of 1000° C.

Figure 8B:
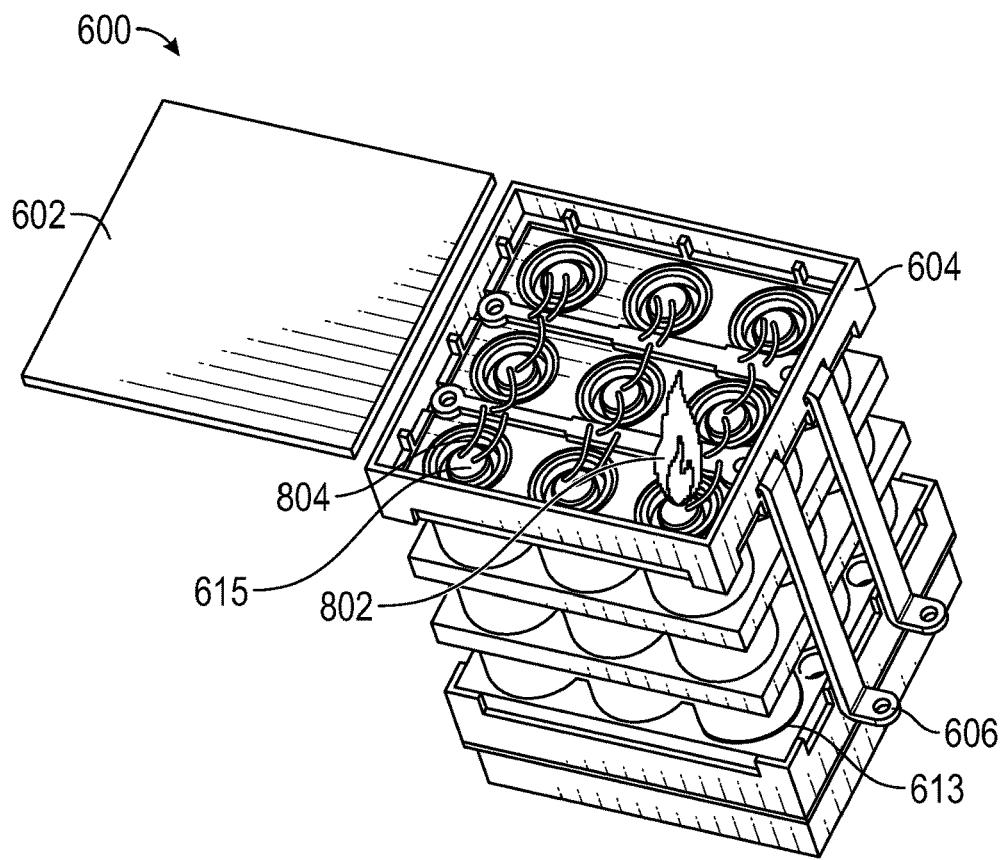

As illustrated by FIG. 8B, the pressure difference may entirely separate the top cover 602 from the battery pack 600. This may physically transfer the energy absorbed by the top cover 602 away from the battery pack 600, as well as permit a flame 802 from the fire to freely and quickly burn out and release any heat or combustion components, such as into an exhaust channel. Desirably, this can limit one or more other of the multiple battery cells of the battery pack 600 from reaching a temperate of more than 120° C., catching fire, and beginning a thermal runaway, as well as limit a likelihood that a neighboring battery pack catches fire and itself begins a thermal runaway.

The thermal fuse 613, which had previously been thermally coupling the cell tube of the one of the multiple battery cells that caught fire and one of the multiple cooling plates, can detect the thermal runaway (such as by detecting a high temperature condition) and, responsive to detecting the thermal runaway, decouple the cell tube of the one of the multiple battery cells that caught fire from the one of the multiple cooling plates. This may help prevent heat from the fire from transferring via the one of the multiple cooling plates to another cell tube of the multiple cell tubes of the battery pack 600.

Figure 9:
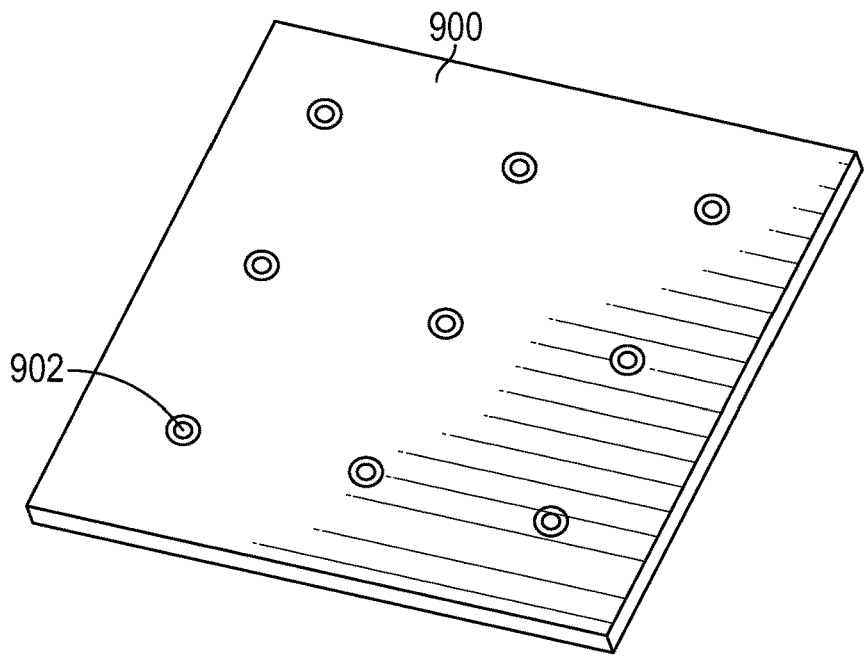
FIG. 9 illustrates an example top cover with holes usable with a battery pack, such as the battery pack of FIGS. 6A, 6B, and 6C.

FIG. 9 illustrates a top cover 900 with cover holes, such as a cover hole 902, usable with a battery pack, such as the battery pack 600. The top cover 900 can be used in place of the top cover 602. The cover holes can permit combustion products, fumes, smoke, heat, or steam to escape from one or more of the multiple battery cells of the battery pack 600 that catch fire without permitting the combustion products, fumes, smoke, heat, or steam to enter another of the multiple battery cells. The cover holes may permit a certain amount or rate of combustion products, fumes, smoke, heat, or steam to escape and a certain amount of energy absorption by the top cover 900 prior to the top cover 900 being moved by a pressure difference between (i) a pressure in the one or more cell tubes of the one or more of the multiple battery cells that catch fire and (ii) a pressure on a side of the top cover 602 opposite the one or more cell tubes of the one or more of the multiple battery cells that catch fire.

Figure 10A:
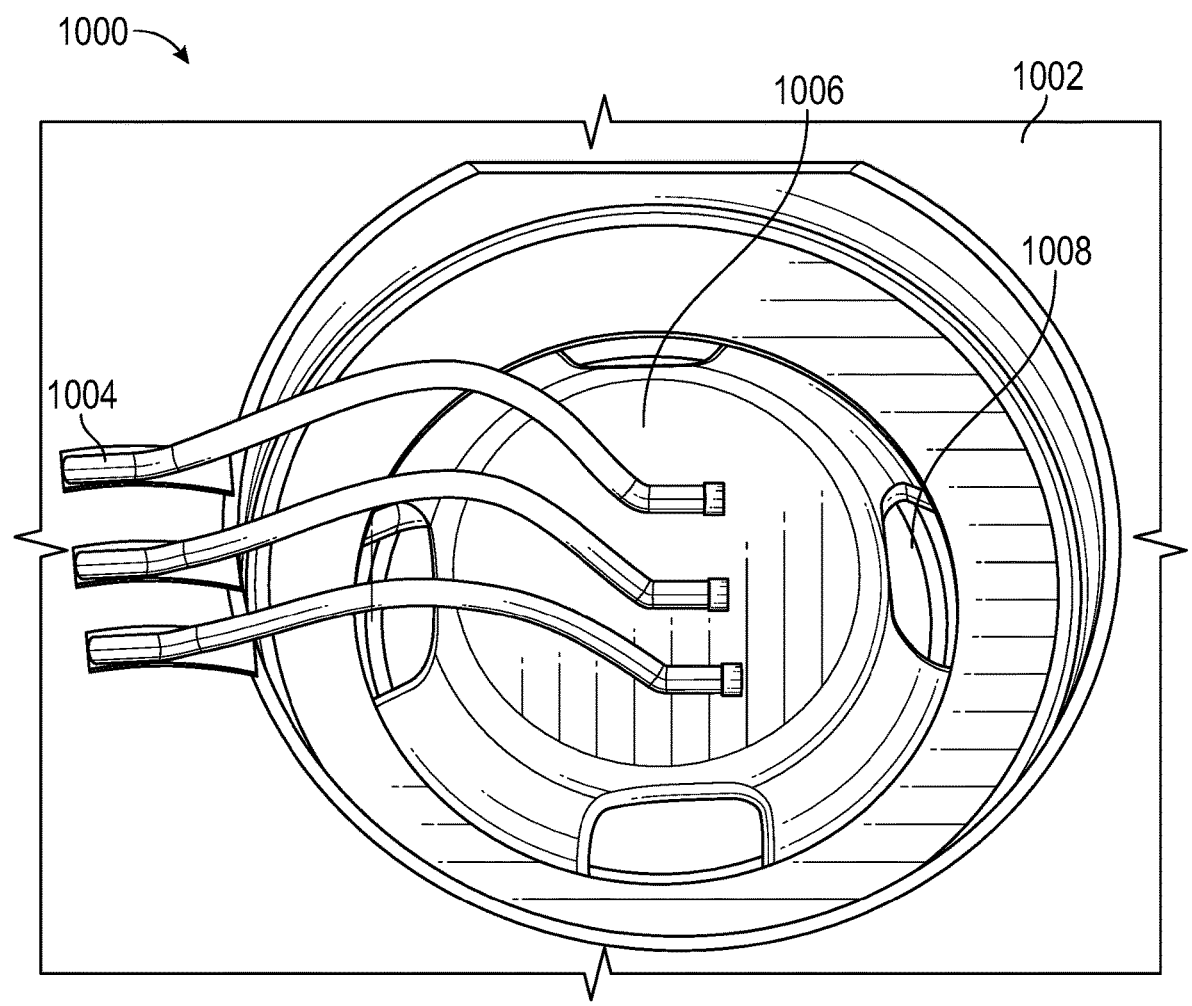
FIGS. 10A and 10B illustrate example connection mechanisms usable with a battery pack, such as the battery pack of FIGS. 6A, 6B, and 6C.

FIG. 10A illustrates a hole connection mechanism 1000 usable with a battery pack, such as the battery pack 600. The hole connection mechanism 1000 can include a conductive plate or bar 1002 that may have a plate hole which permits plate bonding wire 1004 (such as aluminum bonding wire) or spot welding to mechanically and electrically connect to a bottom 1006 of a cell tube. The bottom 1006 can, in turn, be electrically connected to a terminal (for instance, a negative or positive terminal) of a battery cell 1008. If the plate bonding wire 1004 may be used, the plate bonding wire 1004 can function as a fuse and decouple its mechanical, electrical, and thermal connection responsive to a high temperature condition or a high electrical current condition. Although not illustrated, the plate bonding wire 1004 or spot welding can be used to directly mechanically and electrically connect the conductive plate or bar 1002 to the battery cell 1008 rather than through the bottom 1006. The conductive plate or bar 1002 can be used in place of one or more of the multiple bottom bus bars of the battery pack 600.

Figure 10B:
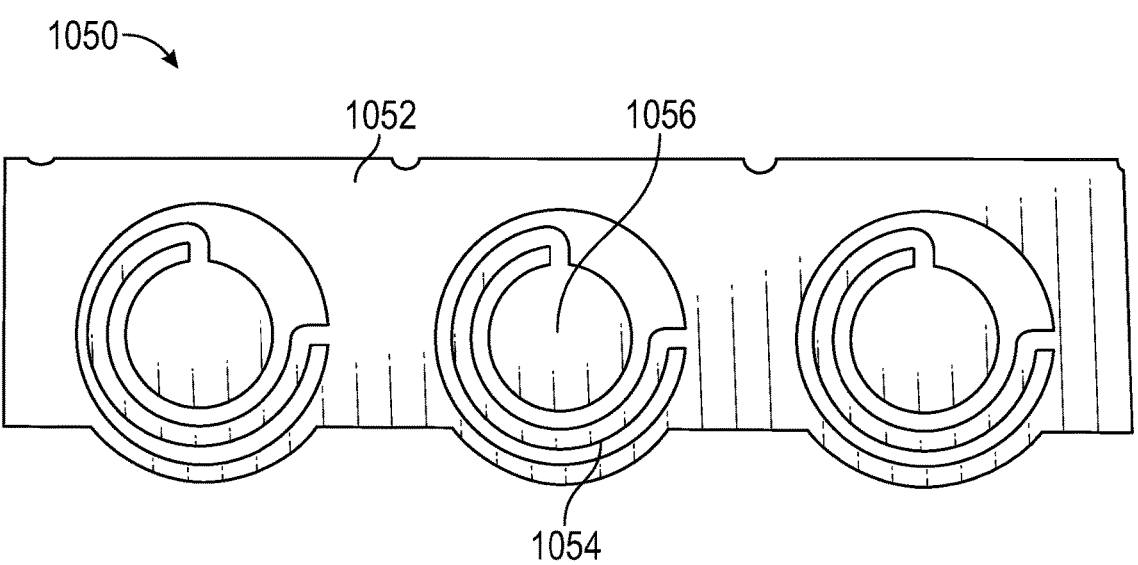

FIG. 10B illustrates a loop connection mechanism 1050 usable with a battery pack, such as the battery pack 600. The loop connection mechanism 1050 can include a conductive plate 1052 that may have plate holes that each include a winding conductor (such as a winding conductor 1054) and a pad conductor (such as a pad conductor 1056). The pad conductors can mechanically and electrically connect to a bottom of a cell tube or a terminal (such as a negative or positive terminal) of a battery cell. The conductive plate 1052 can be used in place of one or more of the multiple bottom bus bars of the battery pack 600. Each of the winding conductors, such as the winding conductor 1054, can function as a fuse and decouple its mechanical, electrical, and thermal connection responsive to a high temperature condition or a high electrical current condition.

Example Implementations

An electric power system is disclosed with integrated fire relief channels for an electric vehicle. The electric power system can include a power source and an exhaust channel. The power source can power a motor that propels a vehicle housing. The power source can include a battery housing configured to support a plurality of battery cells and a conductive plate which electrically connects the plurality of battery cells. The vehicle housing can support the power source and the motor. The exhaust channel can be coupled to the power source and configured to divert a fire from one of the plurality of battery cells toward an exhaust port of the vehicle housing to prevent the fire from spreading to another of the plurality of battery cells.

The electric power system of the preceding paragraph can include one or more of the following features: The electric power system can include an inlet channel coupled to the power source and configured to direct an air flow through the battery housing and into the exhaust channel. The battery housing can orient the plurality of battery cells in a common direction with cathodes of the plurality of battery cells being on a common side of the battery housing. The battery housing can support a conductive plate, and the conductive plate can electrically connect the plurality of battery cells. The conductive plate can electrically connect the plurality of battery cells in parallel with one another. The conductive plate can include copper or aluminum. The conductive plate can include a hole or a weakened portion that is configured to permit the fire to pass into the exhaust channel. The electric power system can include an insulation between the power source and the exhaust channel, and the insulation can prevent the fire from spreading to another of the plurality of battery cells. The insulation can include a fire retardant. The electric power system can include an insulation between the power source and the exhaust channel, and the insulation can break down from the fire to permit the fire to pass into the exhaust channel. The electric power system can include a valve between the power source and the exhaust channel, and the valve can permit the fire to pass into the exhaust channel. The exhaust channel can include a plurality of walls, and the plurality of walls can include aluminum, flame retardant material, or steel. The vehicle housing can support the power source so that an air flow passes through the battery housing toward the exhaust channel when the vehicle housing is in motion. The vehicle housing can fly. A total number of battery cells included in the plurality of battery cells can be between 4 battery cells and 32 battery cells, inclusive. Each of at least some of the plurality of battery cells can be substantially shaped as a cylinder. The battery housing can be substantially shaped as a rectangular prism. The battery housing can include flame retardant material. The battery housing can include plastic. The power source can include one or more sensors configured to monitor a voltage or a temperature of the plurality of battery cells, and the one or more sensors may not be positioned between the battery housing and the exhaust channel. The power source can have an output voltage less than 800 V. The power source can have a maximum power output between 1 kW and 1 MW during operation. The power source can have a maximum voltage output between 10 V and 800 V during operation. The power source can have a maximum current output between 20 A and 500 A during operation. The battery housing can couple to additional battery housings on opposite sides of the battery housing. Additional battery cells of the additional battery housings are configured to be electrically coupled in series with the plurality of battery cells. The exhaust channel can divert another fire from one of the additional battery cells to the exhaust port to prevent the another fire from spreading to another of the plurality of battery cells or the additional battery cells.

The electric power system of the preceding two paragraphs can include one or more of the following features: A plurality of cell tubes can support the plurality of battery cells within the plurality of cell tubes so that individual of the plurality of battery cells are positioned within individual of the plurality of cell tubes, the plurality of cell tubes being supported by the battery housing with one first end of each cell tube being directed toward the exhaust channel, the plurality of battery cells each being self-contained, the plurality of battery cells being removable from the plurality of cell tubes. An inlet channel arranged to direct an air flow through the battery housing and into the exhaust channel, a second end of each of the plurality of cell tubes being directed toward the inlet channel. A cover supported by the battery housing. The cover can include a material that absorbs heat from a first fire in one of the plurality of battery cells. The cover can be removably positioned on the battery housing so that the cover can be separated from the battery housing by a pressure caused by the first fire. The cover can include a plurality of holes that permit the combustion components to pass through the cover. A heat absorber material can be supported by the battery housing, the heat absorber material being positioned in a path of the combustion components so that the heat absorber material absorbs first heat from a first fire in one of the plurality of battery cells. The heat absorber material can include a phase change material. The heat absorber material can be positioned between the cover and the plurality of cell tubes. A plurality of cooling plates can be supported by the battery housing and thermally coupled to the plurality of cell tubes, at least one of the plurality of cooling plates comprising a plurality of holes through which the plurality of cell tubes extend, the plurality of cooling plates being configured to dissipate heat from the plurality of cell tubes. A sensor can monitor a temperature of one of the plurality of cell tubes or one of the plurality of cooling plates. A thermal fuse can mechanically and thermally couple one of the plurality of cooling plates to one of the plurality of cell tubes. The plurality of cooling plates can include aluminum foam. The battery housing, the plurality of cell tubes, and the plurality of cooling plates are configured to evenly distribute heat so that the plurality of battery cells age at a common rate. An isolation can be positioned between (i) the conductive plate and (ii) the plurality of cell tubes, the isolation providing electrical or thermal insulation. The conductive plate can electrically connect the plurality of battery cells in parallel with one another. The plurality of cell tubes can include aluminum, steel, or carbon. The plurality of cell tubes can be arranged in at least two rows of cell tubes and at least two columns of cell tubes. A circuit board assembly can be supported by the battery housing and include a controller, the controller being configured to monitor one or more parameters of the plurality of battery cells or control an energy transfer from the plurality of battery cells to the motor. The battery housing can mechanically couple to additional battery housings on opposite sides of the battery housing, the battery housing and the additional battery housings each having a common structure, the plurality of battery cells being configured to electrically couple in series or parallel with additional battery cells of the additional battery housings to together power the motor. The additional battery housings can support the additional battery cells within additional cell tubes, the additional cell tubes and the plurality of cell tubes being configured to direct any combustion components from any fires from the additional battery cells and the plurality of battery cells in the common direction. A circuit board assembly can be provided and include a sensor (622) configured to monitor a voltage, a current, or an internal pressure of at least one of the plurality of battery cells (614), and a controller can be mounted on the circuit board assembly and control an energy transfer from the plurality of battery cells responsive to the voltage, the current, or the internal pressure. The controller can communicate, via a connector, with an electronic device separate from the battery housing. A total number of battery cells included in the plurality of battery cells is between 4 battery cells and 32 battery cells, inclusive. The vehicle housing can fly and support the battery housing so that an air flow passes through the battery housing toward the exhaust channel when the vehicle housing is in motion.

The electric power system of the preceding three paragraphs can include one or more of the following features: The conductive plate can be a bus bar. Multiple bus bars can be used in place of a single conductive plate.

Additional Features and Terminology

Although examples provided herein may be described in the context of an aircraft, such as an electric or hybrid aircraft, one or more features may further apply to other types of vehicles usable to transport passengers or goods. For example, the one or more futures can be used to enhance construction or operation of automobiles, trucks, boats, submarines, spacecraft, hovercrafts, or the like.

Many other variations than those described herein will be apparent from this disclosure. For example, depending on the embodiment, certain acts, events, or functions of any of the algorithms described herein can be performed in a different sequence, can be added, merged, or left out altogether (for example, not all described acts or events are necessary for the practice of the algorithms).

The various illustrative logical blocks, modules, and algorithm steps described herein can be implemented as electronic hardware, computer software, or combinations of both. To clearly illustrate this interchangeability of hardware and software, various illustrative components, blocks, modules, and steps have been described above generally in terms of their functionality. Whether such functionality is implemented as hardware or software depends upon the particular application and design constraints imposed on the overall system. The described functionality can be implemented in varying ways for each particular application, but such implementation decisions should not be interpreted as causing a departure from the scope of the disclosure.

Conditional language used herein, such as, among others, "can," "might," "may," "e.g.," and the like, unless specifically stated otherwise, or otherwise understood within the context as used, is generally intended to convey that certain embodiments include, while other embodiments do not include, certain features, elements or states. Thus, such conditional language is not generally intended to imply that features, elements or states are in any way required for one or more embodiments or that one or more embodiments necessarily include logic for deciding, with or without author input or prompting, whether these features, elements or states are included or are to be performed in any particular embodiment.

The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list. Further, the term "each," as used herein, in addition to having its ordinary meaning, can mean any subset of a set of elements to which the term "each" is applied.

What is claimed is:

1. An electric power apparatus for use in powering an electric vehicle with an exhaust channel, the electric power apparatus comprising:
   a battery housing;
   a plurality of cell tubes configured to support a plurality of battery cells within the plurality of cell tubes so that individual of the plurality of battery cells are positioned within individual of the plurality of cell tubes, the plurality of cell tubes being supported by the battery housing and configured to direct combustion components from any fires in the plurality of battery cells in a common direction, the plurality of battery cells each being self-contained, the plurality of battery cells being removable from the plurality of cell tubes and configured to be electrically connected to power a motor that propels a vehicle housing, the vehicle housing being configured to support the battery housing and the motor; and
   a plurality of cooling plates supported by the battery housing and thermally coupled to the plurality of cell tubes, at least one of the plurality of cooling plates comprising a plurality of holes through which the plurality of cell tubes extend, the plurality of cooling plates comprising aluminum foam and being configured to dissipate heat from the plurality of cell tubes.

2. The electric power apparatus of claim 1, further comprising a cover supported by the battery housing, the cover comprising a material that absorbs heat from a first fire in one of the plurality of battery cells.

3. The electric power apparatus of claim 2, wherein the cover is removably positioned on the battery housing so that the cover is separated from the battery housing by a pressure caused by the first fire.

4. The electric power apparatus of claim 1, further comprising a cover supported by the battery housing, the cover comprising a plurality of holes that permit the combustion components to pass through the cover.

5. The electric power apparatus of claim 1, further comprising a heat absorber material supported by the battery housing, the heat absorber material being positioned in a path of the combustion components so that the heat absorber material absorbs first heat from a first fire in one of the plurality of battery cells.

6. The electric power apparatus of claim 5, wherein the heat absorber material comprises a phase change material.

7. The electric power apparatus of claim 5, further comprising a cover removably supported by the battery housing, the cover comprising a material that absorbs second heat from the first fire, the heat absorber material being positioned between the cover and the plurality of cell tubes.

8. The electric power apparatus of claim 1, further comprising a sensor configured to monitor a temperature of one of the plurality of cell tubes or one of the plurality of cooling plates.

9. The electric power apparatus of claim 1, further comprising a thermal fuse mechanically and thermally coupling one of the plurality of cooling plates to one of the plurality of cell tubes.

10. The electric power apparatus of claim 1, wherein the battery housing, the plurality of cell tubes, and the plurality of cooling plates are configured to evenly distribute heat so that the plurality of battery cells age at a common rate.

11. The electric power apparatus of claim 1, further comprising:
   a plate or a plurality of bus bars supported by the battery housing, the plate or the plurality of bus bars being configured to electrically connect the plurality of battery cells to one another and to additional battery cells of another battery housing different from the battery housing; and
   an isolation positioned between (i) the plate or the plurality of bus bars and (ii) the plurality of cell tubes, the isolation providing electrical or thermal insulation.

12. The electric power apparatus of claim 11, wherein the plate or the plurality of bus bars is configured to electrically connect the plurality of battery cells in parallel or series with one another.

13. The electric power apparatus of claim 1, wherein the plurality of cell tubes comprises aluminum, steel, or carbon.

14. The electric power apparatus of claim 1, wherein the plurality of cell tubes are arranged in at least two rows of cell tubes and at least two columns of cell tubes.

15. The electric power apparatus of claim 1, further comprising a circuit board assembly supported by the battery housing and comprising a controller, the controller being configured to monitor one or more parameters of the plurality of battery cells or control an energy transfer from the plurality of battery cells to the motor.

16. The electric power apparatus of claim 1, wherein the battery housing is configured to mechanically couple to additional battery housings on opposite sides of the battery housing, the battery housing and the additional battery housings each having a common structure, the plurality of battery cells being configured to electrically couple in series with additional battery cells of the additional battery housings to together power the motor.

17. The electric power apparatus of claim 16, further comprising the additional battery housings, the additional battery housings being configured to support the additional battery cells within additional cell tubes, the additional cell tubes and the plurality of cell tubes being configured to direct any combustion components from any fires from the additional battery cells and the plurality of battery cells in the common direction.

18. The electric power apparatus of claim 1, further comprising:
   a circuit board assembly comprising a sensor configured to monitor a voltage, a current, or an internal pressure of at least one of the plurality of battery cells; and
   a controller mounted on the circuit board assembly and configured to control an energy transfer from the plurality of battery cells responsive to the voltage, the current, or the internal pressure.

19. The electric power apparatus of claim 18, wherein the controller is configured to communicate, via a connector, with an electronic device separate from the battery housing.

20. The electric power apparatus of claim 1, wherein a total number of battery cells included in the plurality of battery cells is between 4 battery cells and 32 battery cells, inclusive.

21. The electric power apparatus of claim 1, in combination with:
   an inlet channel mechanically coupled to the battery housing to direct an air flow through the battery housing and into an exhaust channel; and
   the exhaust channel mechanically coupled to the battery housing to divert the combustion components toward an exhaust port of the vehicle housing.

22. The electric power apparatus of claim 1, in combination with the vehicle housing, the vehicle housing being configured to fly and supporting the battery housing so that an air flow passes through the battery housing toward an exhaust channel of the vehicle housing when the vehicle housing is in motion.

* * * * *

UNITED STATES PATENT AND TRADEMARK OFFICE
CERTIFICATE OF CORRECTION

Page 1 of 1

PATENT NO. : 10,854,866 B2
APPLICATION NO. : 16/842595
DATED : December 1, 2020
INVENTOR(S) : Sébastien Demont et al.

It is certified that error appears in the above-identified patent and that said Letters Patent is hereby corrected as shown below:

In the Specification

In Column 7, Line 12, delete "Intl" and insert --Int'l--.

In the Claims

In Column 24, Line 36, Claim 5, delete "first heat" and insert --heat--.

In Column 24, Line 42, Claim 7, delete "second heat" and insert --heat--.

Signed and Sealed this
Second Day of February, 2021

Drew Hirshfeld
*Performing the Functions and Duties of the*
*Under Secretary of Commerce for Intellectual Property and*
*Director of the United States Patent and Trademark Office*